United States Patent
Gibson et al.

(10) Patent No.: US 10,029,402 B2
(45) Date of Patent: Jul. 24, 2018

(54) METHOD AND APPARATUS FOR MANUFACTURING CONTACT LENSES

(71) Applicant: CooperVision International Holding Company, LP, St. Michael (BB)

(72) Inventors: John Robert Gibson, Farnham Common (GB); Hayden Atkinson, Tadley (GB); Terence Michael Cook, Norwich (GB); James Bryan Cook, Beccles (GB)

(73) Assignee: CooperVision International Holding Company, LP, St. Michael (BB)

( * ) Notice: Subject to any disclaimer, the term of this patent is extended or adjusted under 35 U.S.C. 154(b) by 611 days.

(21) Appl. No.: 14/576,231

(22) Filed: Dec. 19, 2014

(65) Prior Publication Data

US 2016/0176091 A1    Jun. 23, 2016

(51) Int. Cl.
  *B29D 11/00* (2006.01)
  *B29C 45/26* (2006.01)
  *B29L 11/00* (2006.01)

(52) U.S. Cl.
  CPC .... *B29C 45/2673* (2013.01); *B29D 11/00173* (2013.01); *B29D 11/00259* (2013.01); *B29L 2011/0041* (2013.01)

(58) Field of Classification Search
  CPC ........ B29D 11/00173; B29D 11/00182; B29D 11/00259; B29C 45/2673; B29L 2011/0041; B65B 55/02; B65B 25/008
  See application file for complete search history.

(56) References Cited

U.S. PATENT DOCUMENTS

| | | |
|---|---|---|
| 5,160,749 A | 11/1992 | Fogarty |
| 5,238,388 A | 8/1993 | Tsai |
| 5,466,147 A | 11/1995 | Appleton et al. |
| 5,540,410 A | 7/1996 | Lust et al. |
| 5,540,543 A | 7/1996 | Lust et al. |
| 5,545,366 A | 8/1996 | Lust et al. |

(Continued)

FOREIGN PATENT DOCUMENTS

| | | |
|---|---|---|
| DE | 29723514 U1 | 10/1998 |
| EP | 0339642 A2 | 11/1989 |

(Continued)

OTHER PUBLICATIONS

International Preliminary Report on Patentability issued in corresponding International Patent Application No. PCT/GB2015/054049 dated Apr. 18, 2017 (5 pages).

(Continued)

*Primary Examiner* — Mathieu D Vargot
(74) *Attorney, Agent, or Firm* — Kilyk & Bowersox, P.L.L.C.

(57) ABSTRACT

Apparatus and methods are described for manufacturing contact lenses by forming a contact lens mold half, and removing the mold half. The mold half can then be combined with a complementary mold half and used to cast-mold a contact lens. The apparatus includes first and second plates each carrying tool halves. The plates reciprocate between an open, spaced apart configuration, and a closed configuration in which they hold complementary tool halves in contact with one another. When the plates are opened after forming a mold half, a gripper plate removes the mold half from the first plate or the second plate.

24 Claims, 16 Drawing Sheets

(56) References Cited

U.S. PATENT DOCUMENTS

| | | |
|---|---|---|
| 5,629,031 A | 5/1997 | Ishikawa et al. |
| 5,681,138 A | 10/1997 | Lust et al. |
| 5,702,735 A | 12/1997 | Martin et al. |
| 5,716,540 A | 2/1998 | Matiacio et al. |
| 5,776,514 A | 7/1998 | Wu et al. |
| 5,850,107 A | 12/1998 | Kindt-Larsen et al. |
| 5,861,114 A | 1/1999 | Roffman et al. |
| 5,928,682 A | 7/1999 | Janca et al. |
| 5,938,988 A | 8/1999 | Lust et al. |
| 5,975,875 A | 11/1999 | Crowe, Jr. et al. |
| 5,980,184 A | 11/1999 | Lust et al. |
| 5,981,618 A | 11/1999 | Martin et al. |
| 6,007,229 A | 12/1999 | Parnell, Sr. et al. |
| 6,079,940 A | 6/2000 | Lust et al. |
| 6,176,669 B1 | 1/2001 | Lust et al. |
| 6,180,032 B1 | 1/2001 | Parnell, Sr. et al. |
| 6,186,736 B1 | 2/2001 | Lust et al. |
| 6,368,522 B1 | 4/2002 | Ansell et al. |
| 6,405,993 B1 | 6/2002 | Morris |
| 6,444,145 B1 | 9/2002 | Clutterbuck |
| 6,502,009 B1 | 12/2002 | Parnell, Sr. et al. |
| 6,511,617 B1 | 1/2003 | Martin et al. |
| 6,592,356 B1 | 7/2003 | Lust et al. |
| 6,732,993 B2 | 5/2004 | Dean |
| 6,752,581 B1 | 6/2004 | Lust et al. |
| 6,827,325 B2 | 12/2004 | Hofmann et al. |
| 6,830,712 B1 | 12/2004 | Roffman et al. |
| 7,156,638 B2 | 1/2007 | Lust et al. |
| 7,156,641 B2 | 1/2007 | Ansell et al. |
| 7,516,937 B2 | 4/2009 | Hofmann et al. |
| 7,585,167 B2 | 9/2009 | Lawton et al. |
| 7,811,483 B2 | 10/2010 | Witko |
| 7,935,280 B2 | 5/2011 | Lawton et al. |
| 8,038,912 B2 | 10/2011 | Beebe et al. |
| 8,105,070 B2 | 1/2012 | Reynolds et al. |
| 8,221,659 B2 | 7/2012 | Beebe et al. |
| 8,287,269 B2 | 10/2012 | Dubey et al. |
| 2005/0167038 A1 | 8/2005 | Torris et al. |
| 2006/0145369 A1 | 7/2006 | Lawton et al. |
| 2006/0145370 A1 | 7/2006 | Lawton et al. |
| 2006/0145372 A1 | 7/2006 | Jones et al. |
| 2006/0278654 A1* | 12/2006 | Huber ............... B65G 57/165 221/175 |
| 2007/0052117 A1 | 3/2007 | Arnet et al. |
| 2007/0267765 A1 | 11/2007 | Ansell et al. |
| 2008/0102151 A1 | 5/2008 | Perez et al. |
| 2014/0103552 A1 | 4/2014 | Nakahashi et al. |

FOREIGN PATENT DOCUMENTS

| | | |
|---|---|---|
| EP | 0882560 A2 | 12/1998 |
| EP | 0888871 A1 | 1/1999 |
| EP | 0919352 A1 | 6/1999 |
| EP | 1561560 A1 | 8/2005 |
| EP | 1752280 A2 | 2/2007 |
| EP | 1752281 A2 | 2/2007 |
| EP | 1545865 B1 | 1/2008 |
| JP | 04361010 A | 12/1992 |
| JP | 08-300425 * | 11/1996 |
| JP | 08300425 A | 11/1996 |
| JP | 2002-059465 A | 2/2002 |
| WO | 2000059713 A1 | 10/2000 |
| WO | 2001074574 A2 | 10/2001 |
| WO | 2008039485 A1 | 4/2008 |
| WO | 2008078395 A1 | 7/2008 |

OTHER PUBLICATIONS

Search and Examination Report issued in corresponding United Kingdom Patent Application No. 1422767.2 dated Jun. 19, 2015 (8 pages).

International Search Report and Written Opinion issued in corresponding International Patent Application No. PCT/GB2015/054049 dated Mar. 14, 2016 (12 pages).

Examination Report issued in United Kingdom Patent Application No. GB1422767.2 dated May 23, 2017 (4 pages).

* cited by examiner

METHOD AND APPARATUS FOR MANUFACTURING CONTACT LENSES

FIELD

This disclosure relates to the field of contact lens manufacture. In particular, the disclosure provides a method of and apparatus for rapidly injection molding contact lens mold halves and receiving the injection molded mold halves into mold-removing elements of a gripper plate in significant numbers and at high speed.

BACKGROUND

Various methods of manufacturing contact lenses are known, including spin casting, lathing (for example by diamond turning), and cast molding (for example, using injection molded mold halves). In particular, cast molding of contact lenses involves forming a pair of mold halves (i.e., a first mold half and a second mold half), placing a volume of a contact lens formulation on an optical quality surface of one of the two mold halves, and placing the two mold halves in contact with each other to form a contact lens mold assembly that has a contact lens-shaped cavity containing the contact lens formulation. The contact lens mold assembly is then exposed to conditions to cause the contact lens formulation to polymerize or cure in the contact lens mold assembly. As understood in the art, the mold halves may be referred to as "mold sections" (i.e., first and second mold sections) or "mold members" (i.e., first and second mold members). Using cast molding processes on automated high speed manufacturing lines, contact lenses can be manufactured in large numbers, for example, tens of thousands of lenses each day. Increases in the rate of manufacture of contact lenses can be expected to bring down the cost of each lens. It is important, however, that increased rates of manufacture do not compromise the quality of the lenses produced.

When contact lenses are formed by cast molding using injection molded contact lens mold halves, the process includes many steps. For example, the process can include closing two halves of injection molding mold tools provided in plates of an injection molding machine, forming the contact lens mold halves in the closed injection molding mold tools, opening the mold tools containing the injection molded mold halves, removing the injection molded mold halves from the opened mold tools, and optionally transferring the newly formed mold halves to a transporter for further processing. As understood by persons skilled in the art, and as used herein, an injection molding mold tool refers to the metallic inserts used to form curved surfaces of the contact lens mold halves. The metallic inserts are typically provided in plates of an injection molding machine. One or both of the metallic inserts, or mold tools, will have an optical quality surface used to form a lens-forming surface of a contact lens mold half. Each of these steps requires that the mold tools and mold halves be treated with care in order to avoid damaging them or contaminating them. In some cases, the thermoplastic material of the newly formed mold halves can still be warm and/or somewhat malleable shortly after the injection molding process has been completed. The needs of high-speed manufacturing lines require apparatus and methods for rapidly removing the newly formed injection molded mold halves from the mold tools without damaging the mold tools or the newly formed mold halves.

SUMMARY

A first aspect of the disclosure provides an apparatus for forming a contact lens mold half for use in forming a contact lens. The apparatus can comprise: an injection-molding unit, and a contact lens mold half removal unit. The injection-molding unit includes a first plate carrying a plurality of first tool halves, and a second plate carrying a plurality of second tool halves. At least one of the first plate and the second plate can be arranged to reciprocate between (i) an open configuration in which the first plate and the second plate are spaced apart, and (ii) a closed configuration in which the first plate and the second plate are in close proximity to one another and/or the first and second tool halves are in contact such that the first and second tool halves together define an injection cavity for forming a contact lens mold half. In some cases the first and second tool halves can be disposed in, on, or in and on, the first and second plates, and in some cases the tool halves are not yet present.

The contact lens mold half take-out or removal unit includes a rail, a gripper plate mounted on the rail, and a linear motor arranged to propel the gripper plate from a receive position, between the first plate and the second plate, wherein the first plate and the second plate are in an open configuration, toward a deliver position. The gripper plate can include a plurality of mold-removing elements for receiving mold halves from the tool halves when the gripper plate is in the receive position. The first plate can be stationary in the injection molding unit, with the second plate arranged for movement, to provide the reciprocation. The rail can lie in a plane parallel to a plane of contact of the first and second plates when they are in the closed position. The gripper plate can be carried on brackets depending from the rail and can comprise a proximal rectangular portion, to which the depending brackets connect. The gripper plate can also comprise a distal gripper portion on the side of the gripper plate closest to the injection unit.

The mold-removing elements of the apparatus can be mold-receiving heads. The mold-receiving heads can be in positions on the gripper plate corresponding to positions of the tool halves on the first plate. Each mold-receiving head can include a vacuum inlet. Each vacuum inlet can be configured to apply vacuum to a formed contact lens mold half. (As used herein, applying a vacuum means generating a negative pressure.) Each vacuum inlet can be configured to transfer the formed mold half into the mold-receiving head. The gripper plate can comprise a carbon-fiber material.

The apparatus can further comprise a transporter. The transporter can be arranged to transport the formed molds for further processing. Optionally, in addition to the transporter, or instead of the transporter, the apparatus can comprise a take-off robot arranged to receive the formed mold halves from the gripper plate when the gripper plate is in the deliver position. The take-off robot can also transfer the formed mold halves to the transporter. The transporter can have a surface that includes a plurality of cells configured to receive the formed mold halves.

Optionally, the take-off robot can include a pick head. The pick head can be configured to pick up the formed mold halves. The pick head can include pick head vacuum inlets. The pick head vacuum inlets can be arranged to be adjacent to the mold-removing elements of the gripper plate when the gripper plate is in the deliver position, so as to be configured to receive the mold halves from the gripper plate. The pick head can be configured so as to be able to approach the gripper plate, the gripper plate can be configured so as to be able to approach the pick head, or both.

The take-off robot can comprise an arm that carries the pick head. The take-off robot arm can be configured to move from a first position, or orientation, at which the take-off robot receives the formed mold halves from the gripper plate, to a second, different position, or orientation, at which the take-off robot provides the mold halves to the transporter. The take-off robot can include a rotary drive unit. The rotary drive unit of the take-off robot can be configured to rotate the take-off robot arm from the first orientation to the second, different orientation.

The apparatus can further comprise a mold half take-out unit. The mold half take-out unit can include a linear electromagnetic drive. The linear electromagnetic drive of the take-out unit can be configured to propel the take-off robot. The linear electromagnetic drive of the take-out unit can be configured to propel the take-off robot along a second rail.

A second aspect of the disclosure provides a method for manufacturing a contact lens. The method can comprise: reciprocating a first plate carrying a plurality of first tool halves and/or a second plate carrying a plurality of second tool halves, relative to each other, between (i) an open configuration in which the first plate and the second plate are spaced apart, and (ii) a closed configuration in which the first plate and the second plate are in contact and the first and second tool halves together define a plurality of injection molding cavities. Each of the plurality of cavities forms a separate contact lens mold half.

The method also comprises injecting a mold-forming material into the plurality of injection molding cavities when the first plate and the second plate are in the closed configuration, thereby forming a plurality of injection molded mold halves; and propelling a gripper plate between a receive position and a deliver position during the reciprocating, the receive position being a location at which the gripper plate is positioned between the first plate and the second plate when the first plate and the second plate are in the open position, and the deliver position being a location at which the gripper plate is not positioned between the first plate and the second plate; and receiving, with mold-removing elements of the gripper plate, the plurality of contact lens mold halves from the first or second tool halves when the gripper plate is in the receive position. The propelling can comprise using a linear motor to propel the gripper plate.

The method can further comprise applying a vacuum to each of the mold-removing elements of the gripper plate. Applying the vacuum can be effective to transfer the plurality of injection molded mold halves from the first mold tools or from the second mold tools into the mold-removing elements of the gripper plate.

The step of receiving can include stopping the gripper plate when it is in the receive position. Stopping the gripper plate when it is in the receive position can include stopping the gripper plate instantaneously at the receive position. Alternatively, the step of receiving can include moving the gripper plate while it is in the receive position.

During the reciprocating, the action of moving the first plate and the second plate from the open configuration to the closed configuration can begin before the gripper plate has been fully removed from between the first plate and the second plate. Alternatively, during the reciprocating, the action of moving the first plate and the second plate from the open configuration to the closed configuration can begin after the gripper plate has been fully removed from between the first plate and the second plate.

The method can include synchronizing the steps of opening the first plate and the second plate during the reciprocating, followed by inserting the gripper plate between the first plate and the second plate during the propelling, followed by removing the gripper plate from between the first plate and the second plate following the receiving, and followed by closing the first plate and the second plate during the reciprocating. Synchronizing these steps can minimize dwell time of the gripper plate between the first plate and the second plate during the reciprocating.

The method can include accelerating the gripper plate away from the receive position at a rate of more than 45 m/s$^2$ following the receiving.

The method can include stopping the gripper plate at the deliver position, meeting the gripper plate with a pick head at the deliver position, and transferring the plurality of injection molded mold halves from the gripper plate to the pick head during the receiving. The transferring can include applying vacuum to each of the plurality of injection molded mold halves. The transferring can include stopping the application of the vacuum from the mold-receiving heads. Applying the vacuum can comprise using a vacuum pump. The transferring can include starting an application of vacuum through vacuum inlets in the pick heads. The method can include, during the receiving, stopping the application of vacuum from the mold-receiving heads and, substantially simultaneously, starting an application of vacuum through vacuum inlets in the pick head, thereby causing the transferring of the plurality of injection molded mold halves from the mold-receiving head of the gripper plate to the pick head.

The method can include, following the transferring, moving the pick head from the deliver position to a transport position at which the plurality of mold halves are provided to a transporter. Moving from the deliver position to the transport position can comprise moving the pick head from a vertical position to a horizontal position. The method can include, when the pick head is in the transport position, stopping the application of vacuum to the pick head, thereby releasing the plurality of injection molded mold halves onto the transporter. The transporter can include a plurality of cells for receiving the plurality of injection molded mold halves from the pick head.

The transferring can comprise filling the cells of the transporter using a series of passes. In an example, moving the pick head from the deliver position to the transport position can comprise, on successive passes, translating a position where the plurality of injection molded mold halves are released onto the transporter, so that the cells of the transporter are filled up over the successive passes. The transferring can comprise, following filling of a width of the transporter, moving the transporter to present an empty set of cells to the pick head on a subsequent return of the pick head to the transporter.

The method can further comprise the steps of, following the receiving, placing a polymerizable composition onto a lens forming surface of individual mold halves and assembling the mold halves with complementary mold halves to form contact lens mold assemblies having the polymerizable composition in contact lens-shaped cavities. The method can comprise curing the polymerizable composition in the mold assemblies to polymerize the polymerizable composition to form polymerized contact lens bodies. The curing can occur by exposing the mold assemblies to conditions, such as heat or light, to cause polymerization. The method can comprise demolding and delensing the mold assemblies to release the polymerized contact lens bodies. The method can optionally comprise washing, extracting, hydrating, or any combination thereof, the released contact lens bodies. The method can comprise sealing the contact lens bodies in contact lens packages with packaging solution. The method can comprise sterilizing the sealed packages to form packaged contact lenses.

It will be appreciated that features described in relation to one aspect of the present disclosure can be incorporated into other aspects of the present disclosure. For example, an apparatus of the disclosure can incorporate any of the features described with reference to a method of the disclosure, and vice versa.

DETAILED DESCRIPTION

Figure 1:
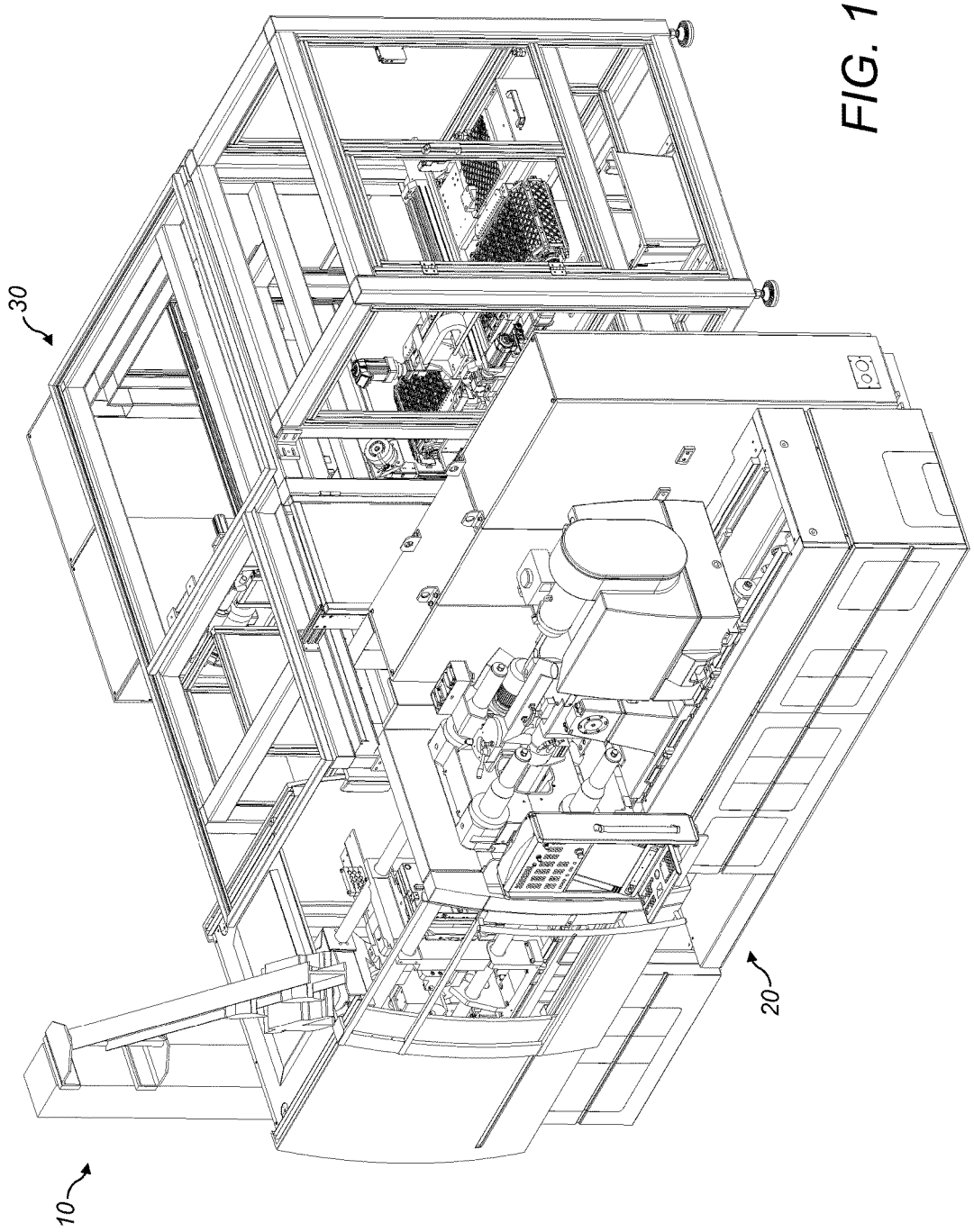
FIG. 1 is a perspective view of an apparatus according to an example of the disclosure.

As previously stated, in a first aspect, the present disclosure is directed to an apparatus for forming a mold half for use in forming a contact lens. The mold half is used interchangeably herein with "contact lens mold half". The apparatus can comprise an injection-molding unit including a first plate carrying a plurality of first tool halves, and a second plate carrying a plurality of second tool halves. As used herein, and as described above, tool halves refer to metallic members that can be present in the injection-molding unit plates during operation of the injection-molding unit. A tool half can be or include an insert that has an optical quality surface for forming an anterior or posterior surface of a contact lens, or a tool half can be or include an insert referred to as a "plug" if it has a curved "non-optical quality surface". This non-optical quality surface corresponds to the opposing surface of the optical quality surface of the mold half obtained from the cavity formed by an insert and a plug.

At least one of the first plate and the second plate can be arranged to reciprocate between (i) an open configuration in which the first plate and the second plate are spaced apart from one another, and (ii) a closed configuration in which the first plate and the second plate are in such close proximity that the first tool halves and the second tool halves are in contact with one another and together define an injection cavity or injection molding cavity for forming a mold half. In the closed configuration, the first plate and second plate can be in contact with one another.

The apparatus can comprise a mold half take-out unit or removal unit. The mold half removal unit includes a rail, a gripper plate mounted on the rail, and a linear motor arranged to propel the gripper plate from a receive position located between the first plate and the second plate, when the first plate and the second plate are in the open configuration, toward or to a deliver position. The gripper plate can include a plurality of mold-removing elements for receiving mold halves from the tool halves when the gripper plate is in the receive position.

The apparatus can further include: a transporter arranged to transport the mold halves for further processing; and a take-off robot arranged to receive the mold halves from the gripper plate when the gripper plate is in the deliver position. The take-off robot can also provide or transport the mold halves received from the gripper plate to the transporter.

The first plate can be stationary in the injection molding unit, and the second plate can be configured to move so as to provide reciprocation. In such an example, tool halves which include "plugs" can be provided in the first plate (i.e., the stationary plate) and tool halves which include "inserts" can be provided in the second plate (i.e., the movable plate). Thus, contact lens mold halves with different surface curvatures can be obtained by removing inserts or tool halves with the inserts from the movable plate and replacing the removed inserts with different inserts having different curvatures on the optical quality surfaces. The plugs or inserts can be provided in bushings, such that a single bushing contains either a plug or an insert; in that case, a tool half can be understood to be a two-piece device consisting of a bushing and either a plug or an insert.

The first tool halves can be arranged in a plurality of cavities in the first plate, for example, arranged in an array and positioned in an array of cavities. In some embodiments, the first plate has 8 cavities for 8 first tool halves. In other embodiments, the first plate has 16 cavities for 16 first tool halves. In some other embodiments, the first plate has 32 cavities for 32 first tool halves.

Each of the first tool halves can include a tool portion. The tool portion can be understood to be a plug and can be provided in a separate bushing, or provided as a unitary device. The tool portion can include an outer surface that is shaped to define a surface of a contact lens mold half that is to be formed in the injection molding cavity. The outer surface of the tool portion can be concave. The outer surface of the tool portion can be convex. All of the tool portions in the first tool halves in the first plate can be identical. Although the outer surface of the tool portion of each first tool half does not need to be an optical-quality surface, it can be.

Each of the first tool halves can include one or more coolant flow passages around the tool portion. The one or more coolant flow passages can be arranged adjacent to the outer surface of the tool portion. In an example, the outer surface of the tool portion, and hence the mold half being formed therewith, can be cooled as rapidly as possible. For example, a mold half can be cooled to a pre-determined temperature, below the melting point of the injected mold material, so that the mold material has solidified, to facilitate removal of the mold half from the first tool half without leaving substantial amounts, if any, of mold material on the first tool half after removal in less than six seconds. In some methods and apparatus, the cooling occurs in less than three seconds, or in less than 2 seconds, for example between 1.5 and 2.5 seconds, or between 1.8 and 2.1 seconds.

Each of the first tool halves can include an injection nozzle or injection port for injecting into an injection cavity a material for forming a mold half. The injection nozzles can be connected to, that is, in fluid communication with, a common manifold. Each injection nozzle can include a valve gate pin. The valve gate pins can be movable from a rearward position, in which the injection nozzles are open, to a forward position, in which the ends of the injection nozzles are shut off by the pins. The pins in the injection nozzles can be mounted on a single plate and moved simultaneously. Such a configuration can ensure simultaneous operation of all of the injection nozzles and simultaneous shutting off of all the injection nozzles.

Each of the first tool halves can include a thermocouple for monitoring a temperature of the injected material. The injection nozzle, the thermocouple, or both, can be positioned in a peripheral region of the first tool half, i.e., away from the tool portion. Positioning the injection nozzle and/or the thermocouple away from the tool portion can free up space for coolant flow passages, enabling such passages to be positioned closer to the outer surface of the tool portion than would otherwise be possible. Each of the first tool halves can include, or be associated with, a stripper plate for detaching the formed mold halves from the tool portions of the first tool halves. The stripper plate can be movable from a rearward position, for forming a mold half, to a forward position, for ejecting a formed mold half.

The second plate can include a quick-change plate. The quick-change plate can include second tool halves arranged to form, in co-operation with the first tool halves of the first plate, injection cavities. Each second tool half of the quick-change plate can be releasably mounted in a recess in the quick-change plate.

Although what is described in detail herein is a system wherein the first plate holds first tool halves each including a plug and the second plate holds second tool halves each including an insert, it is to be understood that in some embodiments the first plate can instead hold the tool halves that include tool inserts and the second plate can instead hold the tool halves that include plugs. In such situations, the locations of coolant flow passages, injection nozzles, and thermocouples can instead, or in addition, be in the second plate.

The tool halves of the quick-change plate can each include a collet held in a bushing. Each bushing can include a coolant passage around its outer circumference.

Each collet can carry a tool insert. Each collet can comprise a front disc portion and a frustoconical body portion. The frustoconical body portion can define a central tube that forms a coolant passage and that passes from the rear of the body portion to the rear of the tool insert. The second plate can include a clamp to clamp the collet into a recess in the quick-change plate. The frustoconical body portion can include, towards its rear, an annular groove. The clamp can act on the annular groove.

Advantageously, each collet can be unclamped, removed, and replaced, independently with respect to the other collets, enabling flexible interchange of collets carrying different tool inserts. The same plug held in the first plate can be used with different interchangeable collets and tool inserts held in the second plate. All of the inserts held in the second plate can be identical to each other. Alternatively, at least some of the inserts held in the second plate can be different from each other; in that case, lens mold halves of different kinds (e.g. different powers) can be formed simultaneously when the first plate and the second plate are brought together.

Each tool insert can include an optical-quality surface and optionally one or more sidewall-forming surfaces. The outer surface of a corresponding tool portion of a first tool half (a plug), when aligned with the tool insert to form a mold-forming cavity, can form the base of a resulting contact lens mold half. In some cases the tool portion can also optionally provide one or more sidewall-forming surfaces for forming one or more sidewalls of the contact lens mold half.

The optical-quality surface of the tool insert is also described herein as an outermost surface of the insert, although when the optical-quality surface is concave, it is to be understood that the distal peripheral rim of the concave surface is actually the outermost feature. When the optical-quality surface is convex, it literally is the outermost surface of the insert. The outermost surface of the tool portion can be convex or concave. The outermost surface of the tool insert in the quick-change plate can be complementary to (i.e., concave or convex) the corresponding tool portion in the first plate. The outermost surface of the tool insert can define an optical-quality surface for defining, in turn, a lens-forming surface of a mold half. The lens-forming surface of the mold half can, in turn, define an optical surface of a contact lens to be formed using the mold half. The optical surface of the tool insert and an outermost portion of the collet that holds the tool insert can together define an inner surface of a mold half to be formed in the injection cavity.

The rail on which the gripper plate is mounted can lie in a plane that is parallel to the plane of contact of the first and second plates when the plates are in the closed position and the plates contact each other, and parallel to the facing surfaces of the plates when the plates are in close proximity to one another but do not make contact. The gripper plate can be carried on brackets depending from the rail. The brackets can be secured to the rail, and the gripper plate can be attached directly to the brackets.

The gripper plate can comprise a proximal rectangular portion, to which the depending brackets connect, and a distal gripper portion on the side of the gripper plate closest to the injection unit. The distal gripper portion can include mold-removing elements at, in, or on, its front surface.

The mold-removing elements can be mold-receiving heads. The mold-receiving heads can be in positions on the gripper plate (for example, on the distal gripper portion, if present) corresponding to the positions of the tool halves on or in the first plate. Each mold-receiving head can be shaped and sized to receive a mold half that has been formed in the injection cavity. Each mold-receiving head can include a vacuum inlet that is configured to suck the formed mold half from out of the tool half and into the mold-receiving head. The gripper plate thus has a planar surface that is parallel to the mating surfaces of the first and second plates. The mold-receiving heads can be coplanar with the planar plate surface, or the mold-receiving heads can extend from the planar plate surface.

The gripper plate can comprise, consist essentially of, or consist of, a carbon-fiber material, or other similarly light weight and durable material. The use of a carbon-fiber gripper plate facilitates rapid movement of the gripper plate between the first and second mold plates to facilitate removal of the mold halves from the tool halves, and thereby contributes to a further reduction in processing time for manufacturing contact lens mold halves.

The take-off robot of the apparatus can include a pick head or other lens mold-half removal element. The pick head can include vacuum inlets, for example, vacuum inlets connected to a vacuum pump, that is, in fluid communication with a vacuum pump. As used herein, "fluid" refers to either gas or liquid. The pick head vacuum inlets can be arranged to be adjacent to the mold-removing elements of the gripper plate when the gripper plate is in the deliver position, so as to receive the mold halves from the gripper plate. The vacuum inlets of the pick head are in a first plane when adjacent to the gripper plate to receive the mold halves from the gripper plate, and are in a second plane when the take-off robot is providing or transferring the mold halves to the transporter. The take-off robot can move the pick head and the vacuum inlets between the first plane and the second plane. The first plane and the second plane can be orthogonal to one another. The pick head can be configured so as to be able to approach the gripper plate; the gripper plate can be configured so as to be able to approach the pick head, or both.

The take-off robot can comprise an arm configured to move from a first position or orientation position at which the take-off robot receives the mold halves from the gripper plate, and a second, different, position or orientation at which the take-off robot provides or transports the mold halves to the transporter. The arm can carry the pick head. The take-off robot can include a rotary drive unit configured to rotate the arm from the first orientation to the second, different orientation. The mold half take-out unit can include a linear electromagnetic drive configured to propel the take-off robot along a rail, and the rail can be the same as the rail on which the gripper plate is mounted.

The transporter can have a surface having a plurality of cells to receive a respective plurality of mold halves. The plurality of cells can be arranged in a 2D pattern or array. The transporter can comprise a conveyor belt.

In accordance with the second aspect, the present disclosure is directed to a method for manufacturing a contact lens. The method can comprise reciprocating a first plate carrying a plurality of first tool halves, and/or a second plate carrying a plurality of second tool halves, relative to each other, between (i) an open configuration, wherein the first plate and the second plate are spaced apart from one another, and (ii) a closed configuration, wherein the first plate and the second plate are in such close proximity to one another that tool halves carried respectively therein contact one another and together define a plurality of injection molding cavities. In some cases, when in the closed configuration, the first plate and the second plate contact one another. Each of the plurality of cavities can be configured to form a separate or an individual contact lens mold half.

The method can comprise injecting a mold-forming material into the plurality of injection molding cavities when the first plate and the second plate are in the closed configuration, thereby forming a plurality of injection-molded mold halves.

The method can comprise propelling or directing a gripper plate between a receive position and a deliver position during the reciprocating. The receive position can be a location where the gripper plate is positioned between the first plate and the second plate when the first plate and the second plate are in the open position. The deliver position can be a location where the gripper plate is not positioned between the first plate and the second plate. As used herein, propelling refers to moving the gripper plate. The propelling can occur at a constant rate, or can include an accelerating rate, decelerating rate, or both.

The method can comprise receiving, with mold-removing elements of the gripper plate, the plurality of contact lens mold halves from the first or second tool halves when the gripper plate is in the receive position.

The method can further include receiving the mold halves from the gripper plate when the gripper plate is in the deliver position, and providing the mold halves to a transporter. The method can further include transporting the mold halves for further processing.

The method can include injecting a mold-forming material, for example, a polymer including a thermoplastic material, for example, polypropylene or an injection moldable vinyl alcohol copolymer, into the injection cavity. Injection can be carried out by an injection nozzle. The method can include heating the injection nozzle, for example, by using a coil. The method can include monitoring the temperature at the tip of the injection nozzle. The method can include controlling the temperature of the injection nozzle. Controlling the temperature can comprise controlling the temperature of the injection nozzles to ensure that the mold-forming material is injected into each of the injection cavities at the same temperature, and hence at the same flow rate.

The method can include moving pins into the injection nozzles once the cavities are full, to shut off the injection nozzles from the cavities and to stop the flow of the mold-forming material out of the injection nozzles.

The method can include circulating coolant adjacent to the injection cavity, to cool the mold-forming material and thereby form the mold half. The coolant can be circulated adjacent to an optic zone of the mold half as it forms in the cavity. The mold-forming material can comprise a nucleated material.

The method can include moving the first plate and the second plate from the closed configuration to the open configuration, once a mold half has been formed.

The newly formed mold half can remain in the tool half of the first or second plate. The first plate can be prevented from moving and the newly formed mold half can remain in the tool half of the first plate. The method can include moving a stripper plate from a rearward, mold-forming position, to a forward, mold-half ejecting position. The method can include pushing, for example, on peripheral regions of the formed mold half, to eject the formed mold half from the tool half.

After ejection, the mold half can be free to fall out of the tool half under the force of gravity, but can be sucked onto the gripper plate before being able to do so.

In the receive position, a distal portion of the gripper plate can be inserted between the fixed plate and the quick-change plate.

The method can include aligning mold-receiving heads on the gripper plate with the tool halves of the first plate. The method can include applying vacuum, for example, to suck air from the mold-receiving heads. The mold halves can thereby be transferred, for example, by sucking, into the mold-receiving head from the tool halves before the mold halves can fall under gravity.

The method can include, after the mold halves have been received by the gripper plate, causing the first plate and the second plate to return to the closed configuration. Thus, another cycle of mold half formation can be started.

The method can include retracting the gripper plate from between the first plate and the second plate and moving the gripper plate to the deliver position.

The gripper plate can be configured to stop only instantaneously at the receive position. The first plate and second plate can begin to close from the open position to the closed position before the gripper plate has been fully removed from between the first plate and the second plate. The opening apart of the first plate and the second plate towards the open configuration, the insertion of the gripper plate between the first plate and the second plate, the removal of the gripper plate from between the first plate and the second plate, and the closing together of the first plate and the second plate towards the closed position, can be synchronized to minimize the dwell time of the gripper plate between the first plate and the second plate. The synchronization can minimize the time for which any part of the gripper plate is between the first plate and the second plate.

The method can include accelerating the gripper plate towards and/or away from the receive position at more than 45 m/s$^2$, at 50 m/s$^2$ or more, at 70 m/s$^2$ or more, or even at 120 m/s$^2$ or more. For example, the rate of acceleration can be from 45 m/s$^2$ to 500 m/s$^2$. The gripper plate can be configured to reach a maximum velocity of at least 4.5 m/s, of 5 m/s or more, of 7 m/s or more, or of 12 m/s or more. For example, the maximum velocity can be from 4.5 m/s to 50 m/s.

The mold half take-out time, from starting to separate the first plate and the second plate to sending a signal that causes them to close again, can be less than 1 s, or less than 750 ms, or less than 500 ms, or less than 250 ms, or less than 200 ms. For example, the take-out time can be from about 10 ms to about 1000 ms.

The time taken to manufacture each mold half can be less than 10 s, or less than 6 s, or less than 4 s, or less than 3 s. For example, the time taken to manufacture each mold half can be from about 100 ms to 10,000 ms, or from 100 ms to 6,000 ms, or from 100 ms to 5,500 ms. In one particular method, the time to manufacture one set of mold halves from a single formation and removal step is less than 3 seconds.

The method can include stopping the gripper plate at a position at which it is met by a pick head that receives the mold halves from the gripper plate. The method can include aligning vacuum inlets in the pick head with mold-receiving heads of the gripper plate. The method can include stopping the application of a vacuum, for example, stopping evacuation of air from the mold-receiving heads and, substantially simultaneously, applying vacuum, for example, starting an evacuation of air through the vacuum inlets in the pick head. The mold halves can thereby be caused to be transferred from the mold-receiving head to the pick head. The method can include moving the pick head from the position at which the pick head meets the gripper plate to a position at which the mold halves are provided to the transporter. The pick head can be mounted on a rotating arm. In moving from the position at which the pick head meets the gripper plate to a position at which the mold halves are provided to the transporter, the arm can be rotated from a horizontal position to a vertical position, and the pick head can thereby be moved from the vertical position to the horizontal position. When the pick head is in a position at which the mold halves are to be provided to the transporter, the application of a vacuum can be stopped, for example, the evacuation of air from the pick head can be turned off. The mold halves can thereby be released onto the transporter.

The transporter can include a plurality of cells for receiving the mold halves from the pick head. The cells can be arranged in a two-dimensional pattern or array. The position of release of the mold halves onto the transporter can be translated on successive passes so that the cells of the transporter are filled up. When a width of the transporter is full, the transporter can be moved to present an empty set of cells to the pick head on the next return of the transporter. The transporter can move the mold halves in the cells way from the location at which they are released from the pick head, and towards a receptacle. An optical detection system can be provided to detect when a width of the transporter is full and to detect whether an empty set of cells is available.

With reference to the drawings, an example apparatus 10 (FIG. 1) for manufacturing mold halves for use in cast-molding contact lenses includes an injection-molding cell 20 and a take-out cell 30.

Figure 2:
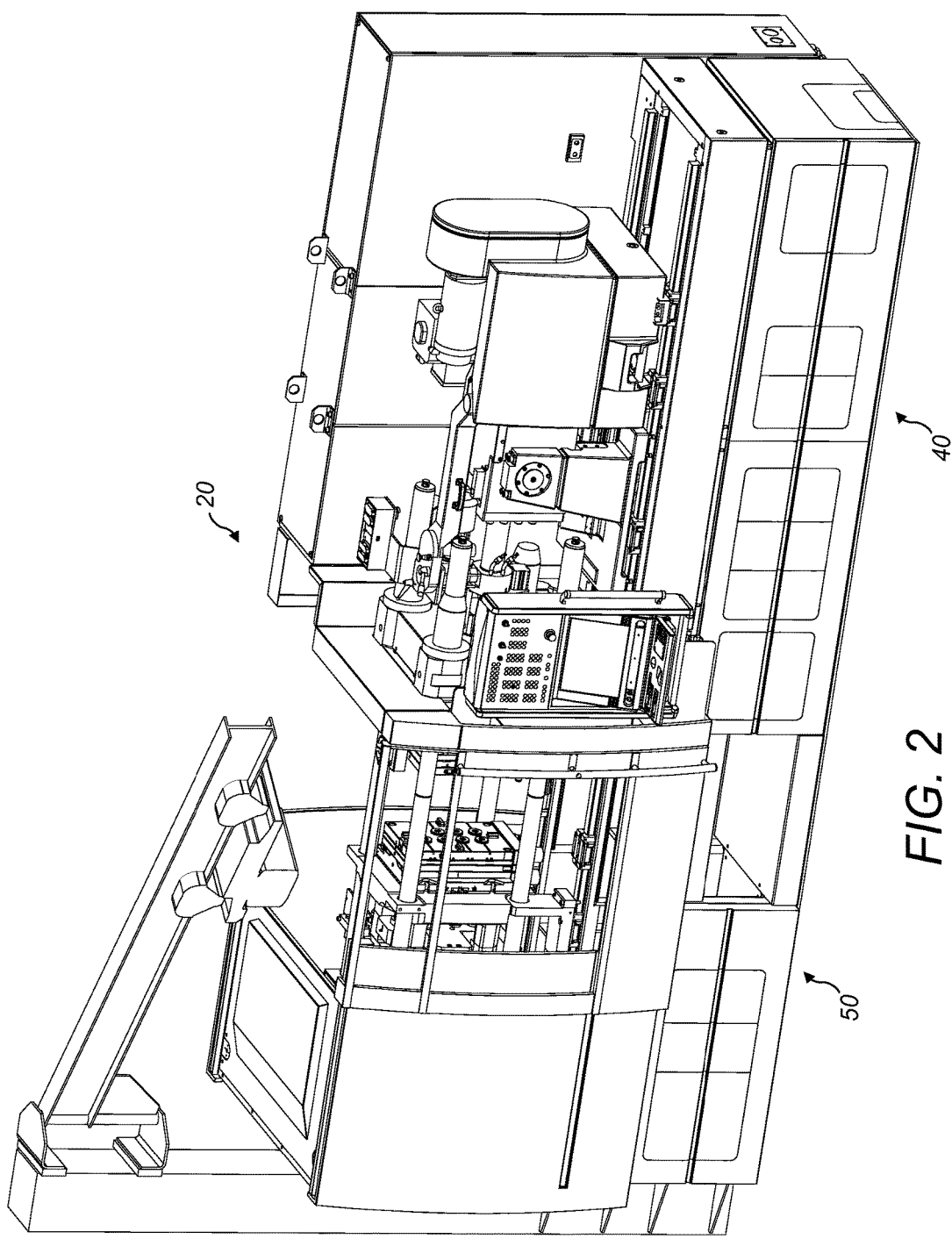
FIG. 2 is a perspective view of an injection-molding cell of the apparatus shown in FIG. 1.

Injection-molding cell 20 (FIG. 2) includes an injection unit 40 and a reciprocating unit 50.

Figure 3:
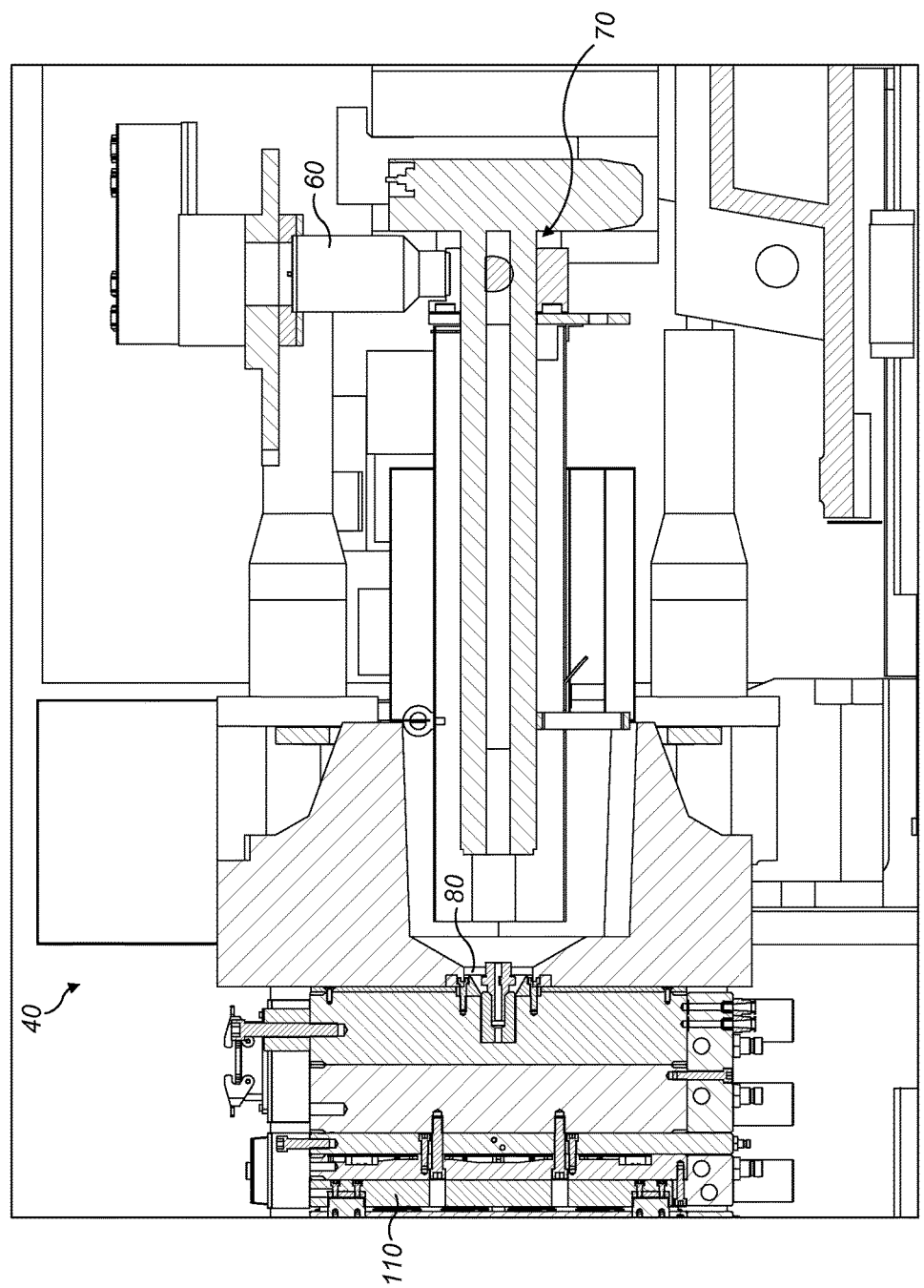
FIG. 3 is a perspective view of an injection unit of the injection-molding cell shown in FIG. 2.

Injection unit 40 (FIG. 3) includes a pellet inlet 60 for receiving pellets of mold forming material, such as polypropylene, from a hopper (not shown). Injection molding cell 20 can include a screw 70, a nozzle 80, and a manifold having a heated inlet bush and eight outlets (not visible in FIG. 3). A first end of screw 70 is arranged beneath the pellet inlet (60), and the other end of screw 70 is connected to nozzle 80. Nozzle 80 is connected to the heated inlet bush of the manifold.

Figure 4:
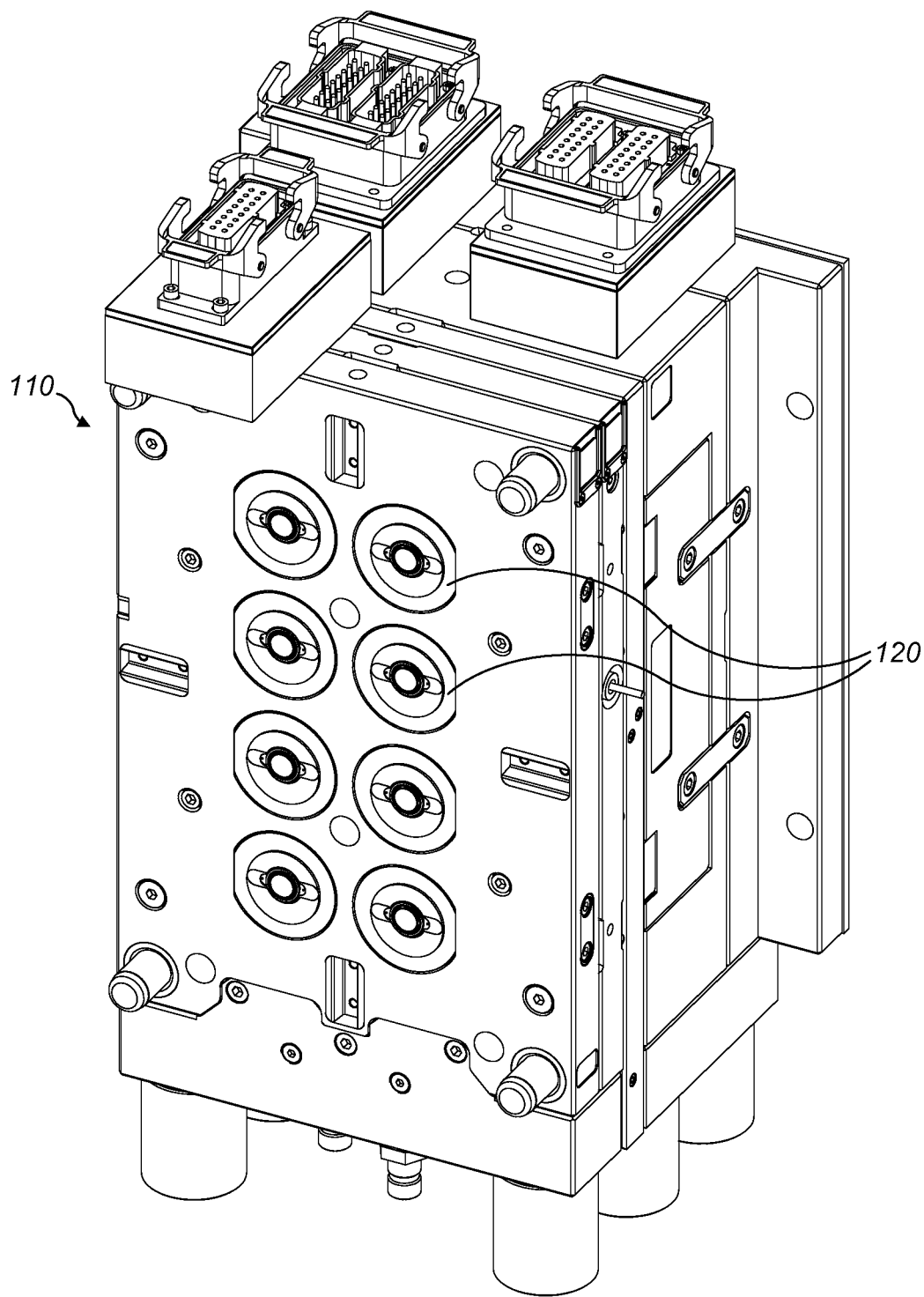
FIG. 4 is a fixed-plate apparatus, forming part of the injection-molding cell shown in FIG. 2.
Figure 5:
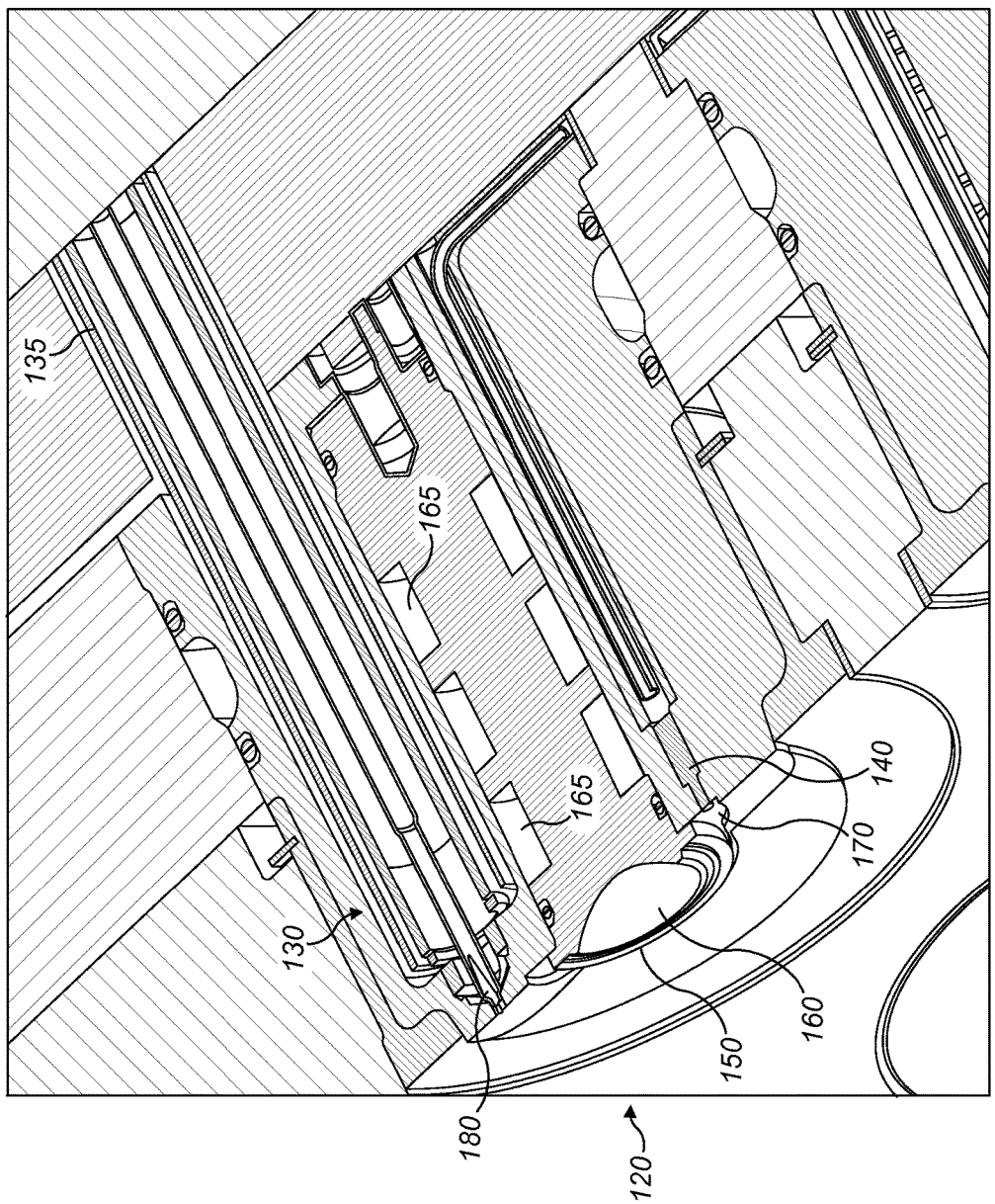
FIG. 5 is a partial cut-away view through a tool half of the fixed-plate apparatus shown in FIG. 3.
Figure 6:
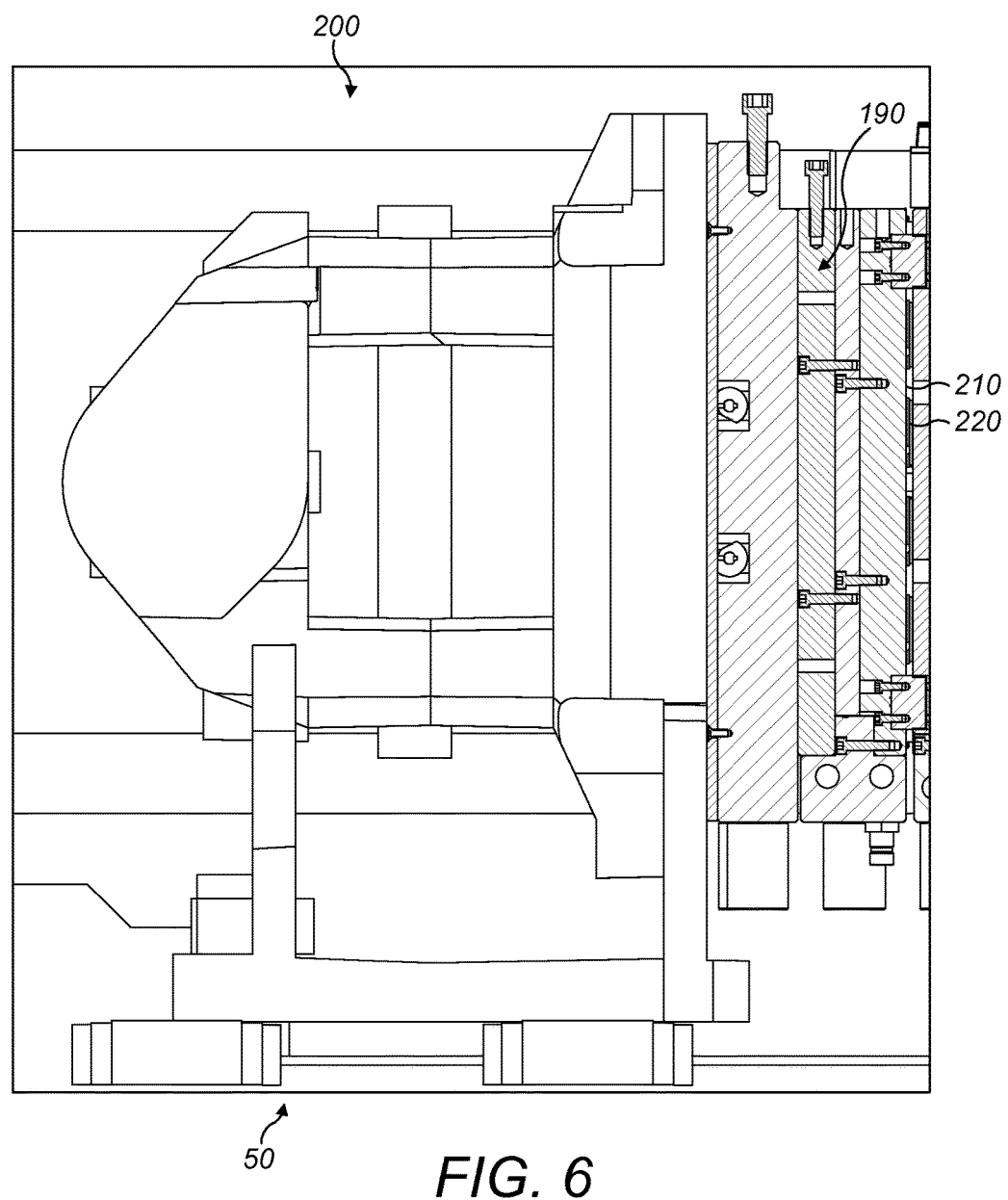
FIG. 6 is a partial cut-away, side perspective view of a reciprocating unit of the injection-molding cell shown in FIG. 2.
Figure 7:
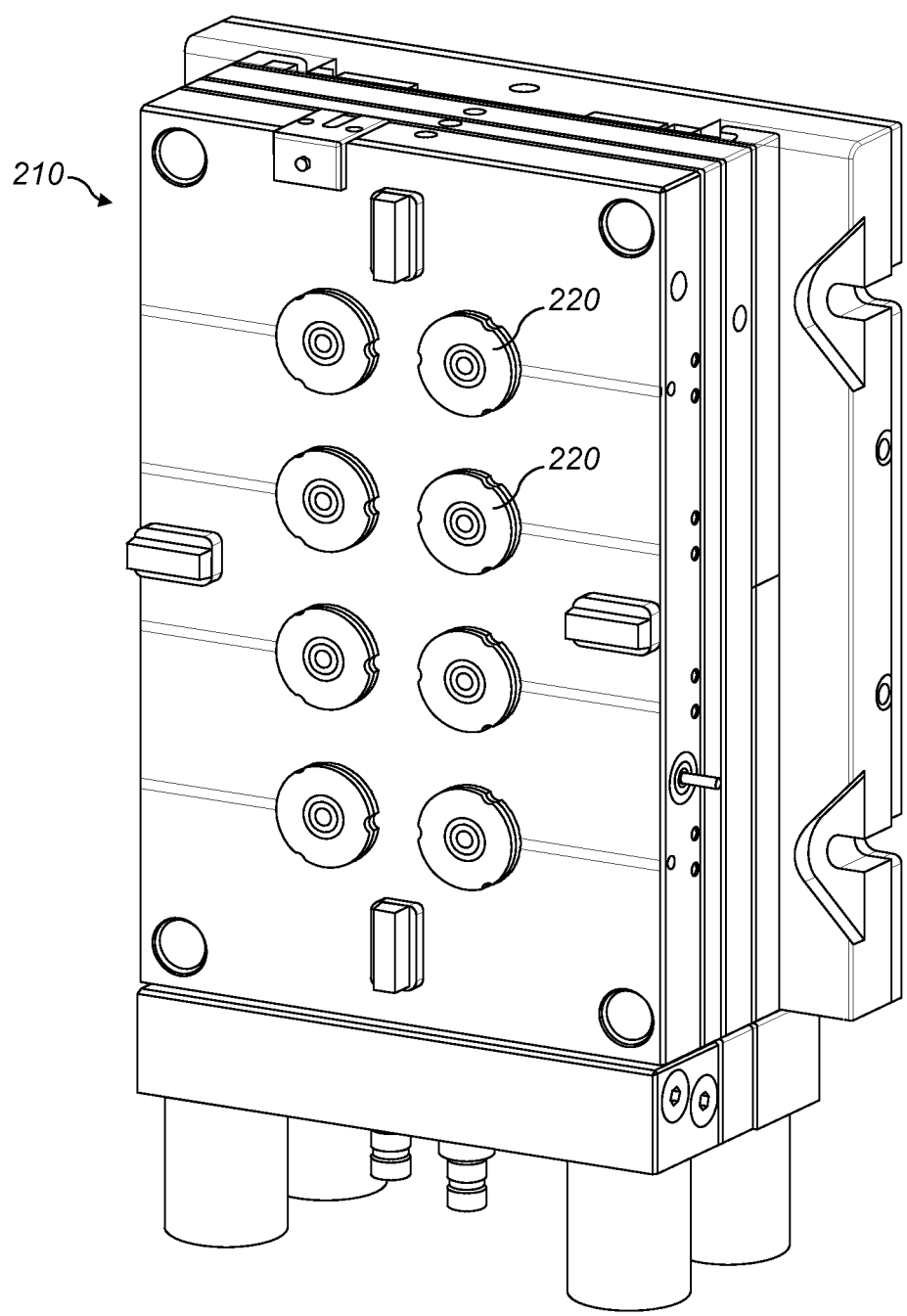
FIG. 7 is a perspective view of a mounting plate of the reciprocating unit shown in FIG. 6.

Injection unit 40 includes a fixed plate 110 (FIGS. 3, 4, and 5) carrying, in this example, eight tool halves 120. As shown in FIG. 5, each tool half 120 includes an injection nozzle 130, a thermocouple 140, a tool portion 150, and a stripper plate (being the front surface of the fixed plate 110) that can be moved forward, for example by a few millimeters, to perform the stripping. Tool portion 150 includes an outer surface 160 that, in the example shown in the drawings, is concave and shaped to define a (convex) outer surface of a contact lens mold half to be formed in the injection cavity. In other, otherwise identical apparatus associated with this apparatus, a concave inner surface of a mold half is formed by providing a tool portion having an outer surface that is convex. Coolant flow passages 165 are provided behind the tool portion, passing, in this example, approximately 4 mm from outer surface 160 at their closest approach. The stripper plate defines a surface of peripheral regions 170 of the mold halves. Provision of peripheral regions 170 enables injection nozzle 130 and thermocouple 140 to be situated away from the center of tool portion 150, which in turn makes room for coolant passages 165 to pass close to tool portion 150, where the portion of the surface of the mold half used to mold the optic zone of a contact lens is formed. The stripper plate is moveable from a rearward, mold-formation position, to a forward, mold-ejection position.

Each outlet of the manifold is connected to a respective injection nozzle 130 of the tool halves. Each injection nozzle 130 includes a valve gate pin 180 just inside its end. Valve gate pins 180 are movable from a rearward position, in which injection nozzles 130 are open, to a forward position, in which the ends of injection nozzles 130 are shut off by the pins. In this example, the distance travelled by each pin 180 between the rearward and forward positions is about 1 mm. Pins 180 in all eight of injection nozzles 130 are mounted on a single plate (not shown) and moved simultaneously, ensuring simultaneous opening and closing of all of injection nozzles 130. Consequently, any variations in flow rate between each tool half 130 is likely due to variations in viscosity (due to variations in temperature) and not due to variations in operation of pins 180.

A reciprocating unit 50 (FIGS. 6 to 9) comprises a mounting plate 190 mounted in a vertical orientation on a reciprocating drive 200.

Figure 8:
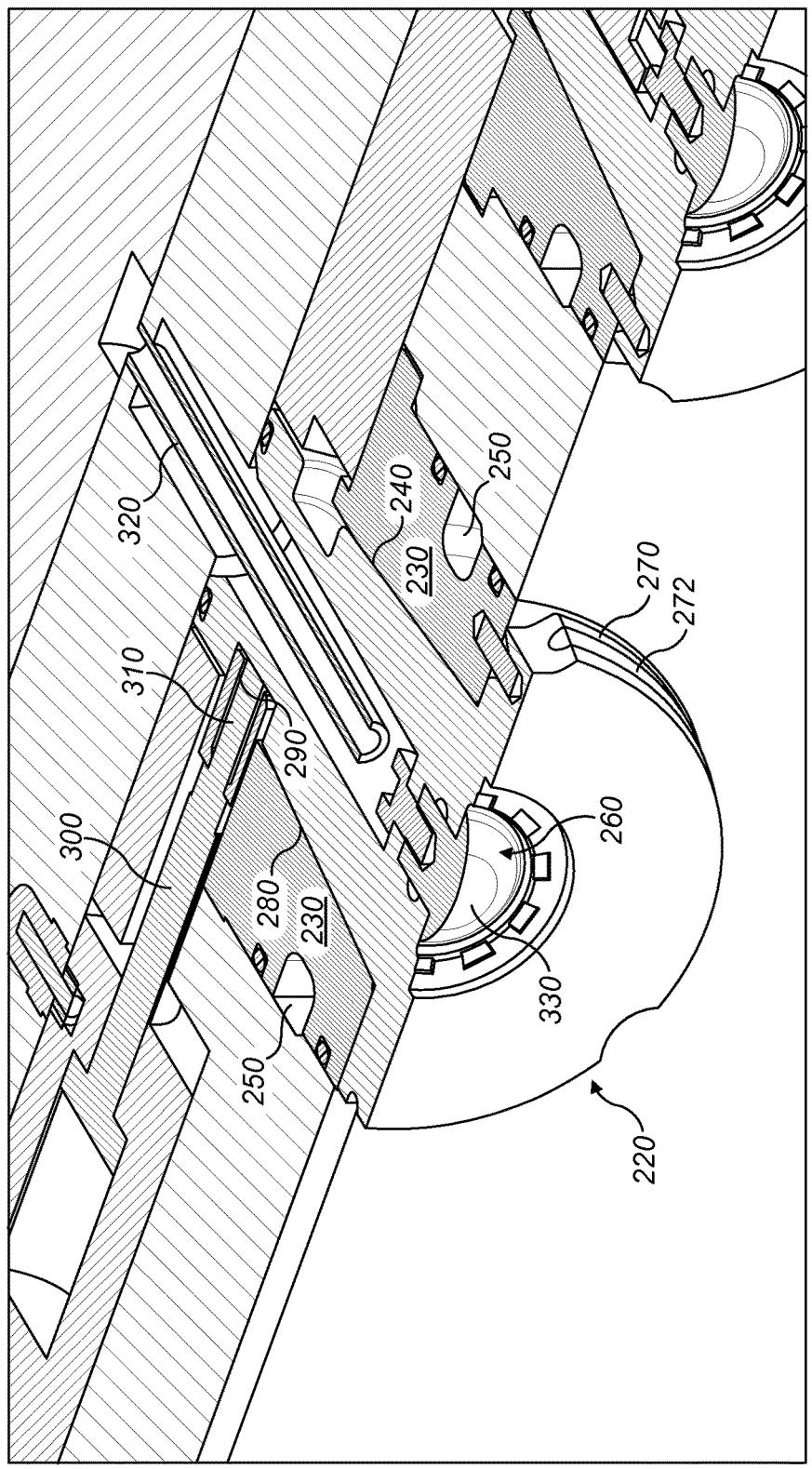
FIG. 8 is a partial cut-away, perspective view through a tool half of the mounting plate shown in FIG. 7.
Figure 9:
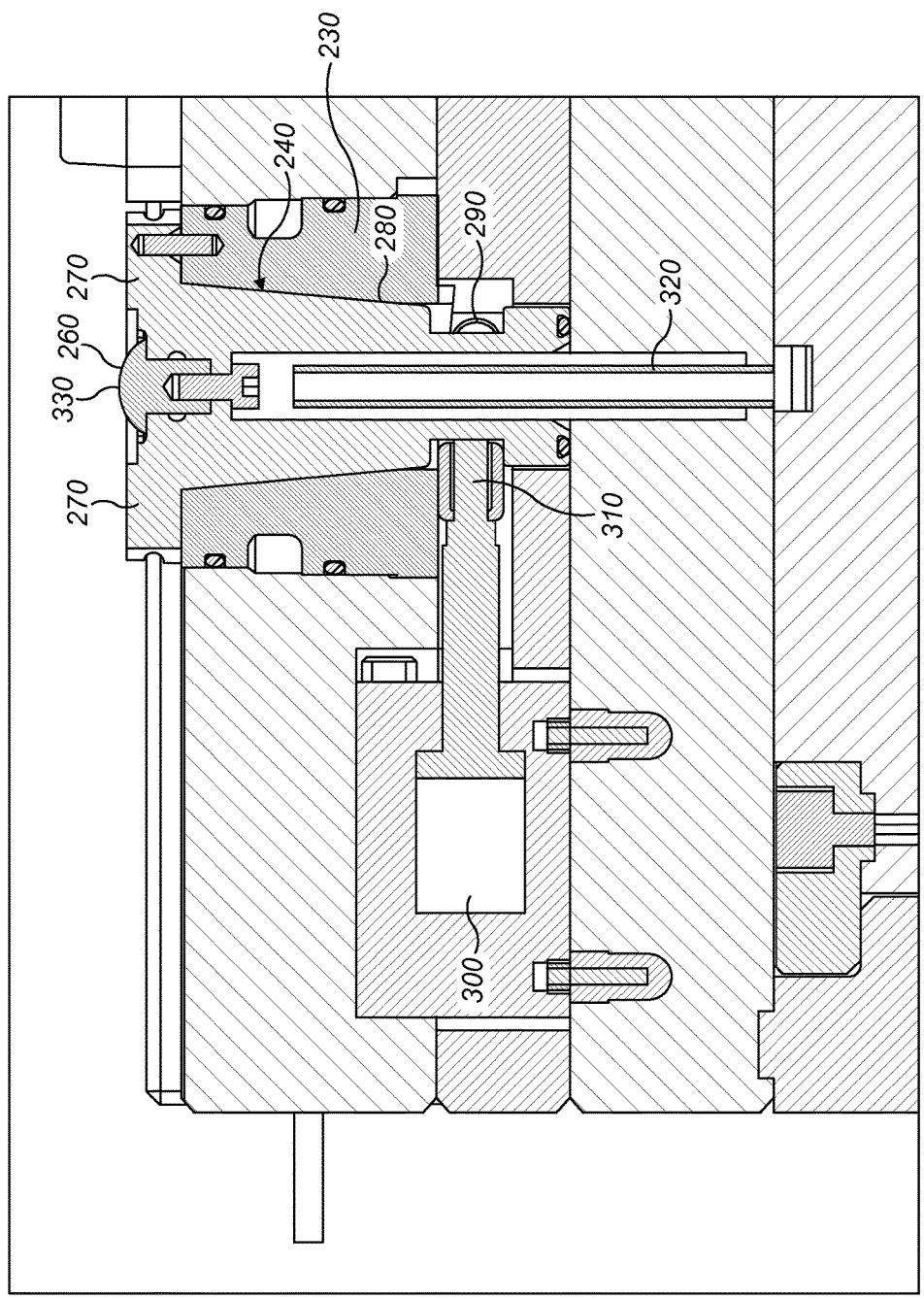
FIG. 9 is a cross-sectional side view through the mounting plate shown in FIG. 7.
Figure 10:
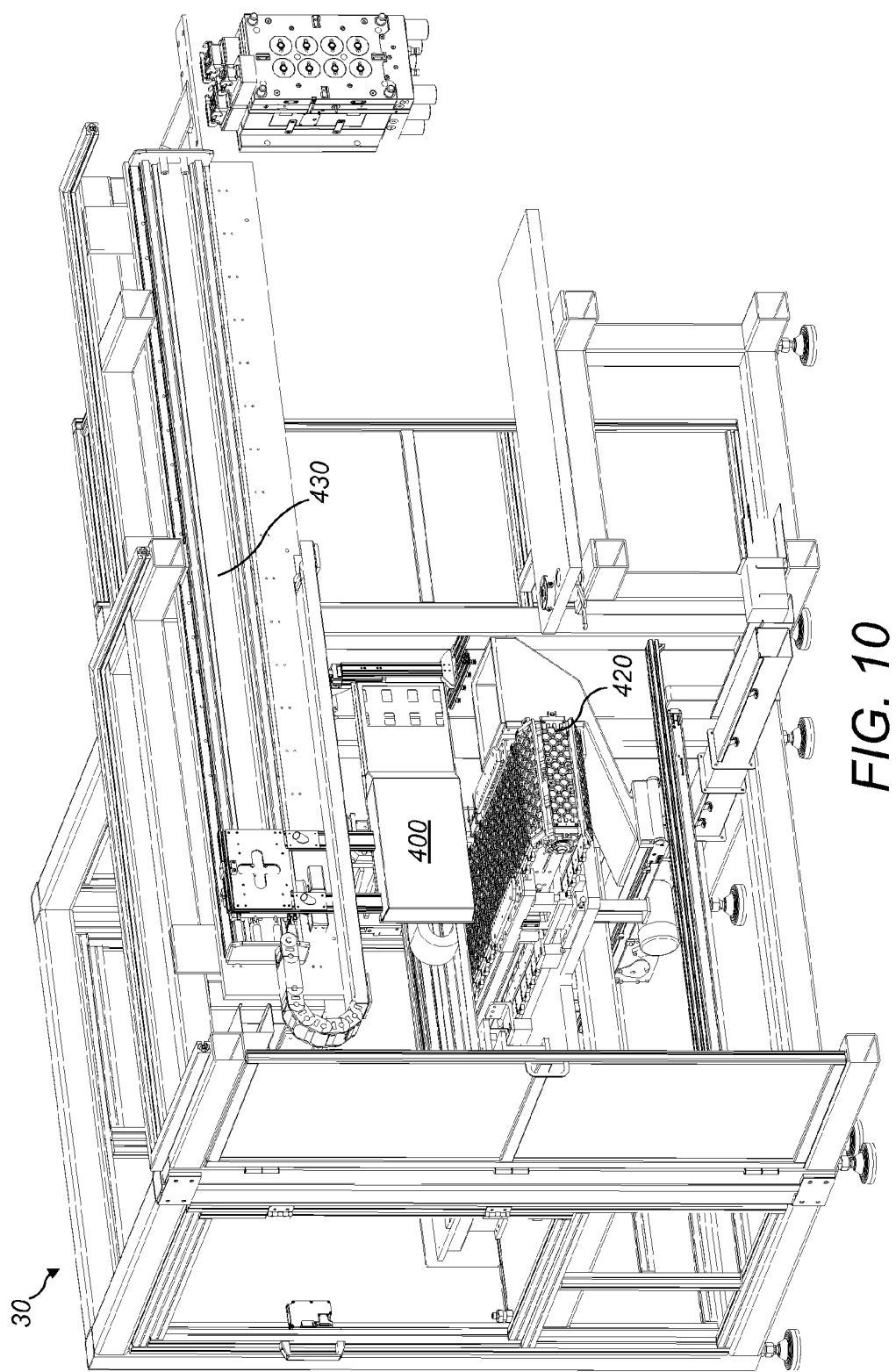
FIG. 10 is a perspective view of the take-out cell of the apparatus shown in FIG. 1.

Mounting plate 190 carries a quick-change plate 210 that includes tool halves 220 that co-operate with tool halves 120 of injection unit 40 to form injection molding cavities for formation of the mold halves. Specifically, quick-change plate 210 defines eight substantially cylindrical cavities each carrying a bushing 230 and, within that, a collet 240 (FIG. 8). The cavities include coolant passages 250 around their outer circumferences. Each collet 240 carries a tool insert 260. Each collet 240 has a front disc portion 270 and a frustoconical body portion 280. Frustoconical body portion 280 includes, towards its rear, an annular groove 290. Reciprocating unit 50 includes a clamp 300 having a distal clamping portion 310 that engages with groove 290 of collet 240 and acts rearwardly in quick-change plate 210, away from the face of plate 210, to retain collet 240 in quick-change plate 210. This clamping prevents both leakage of coolant and prevents collet 240 from dropping out of quick-change plate 210 when quick-change plate 210 is not in contact with fixed plate 110. A tube 320 runs along the centre of frustoconical body portion 280 forming a coolant passage, with coolant passing inside the tube 320 from the rear of body portion 280 to the rear of tool insert 260, and then back towards the rear of body portion 280 along the outside of the tube 320

Note that each collet 240 can be unclamped, removed, and replaced independently of the other collets 240, enabling flexible interchange of collets 240 carrying different tool inserts 260. In particular, it is not necessary to replace the whole quick-change plate 210, nor is it necessary to replace individual tool inserts 260 directly.

Inserts 260 include an outermost surface 330 that is convex, in this example, and defines an optical-quality surface that, in turn, defines a (concave) surface of a mold half. The surface of the mold half in turn defines an optical surface of a contact lens to be formed using the mold half. Optical surface 330 and an outermost portion of collet 240, together define a surface of a mold half to be formed in the injection molding cavity.

Thus, the injection molding cavity for forming the mold half is defined, on the one hand, by outer surface 160 of tool portion 150 carried in each tool half 120 in fixed plate 110 of injection unit 40 and, on the other hand, by the outermost portion of collet 240 and optical-quality surface 330 of tool insert 260 carried by quick-change plate 210 on reciprocating unit 50.

Note that, in this arrangement, the tool providing the optical surface in the mold cavity is in quick-change plate 210 and not in fixed plate 110 that has the injection-molding parts. Consequently, a different optical surface can be readily provided in a mold cavity by changing tool insert 260, without a need to disassemble the injection mechanism.

In injection unit 40, screw 70 is arranged to transport pellets from pellet inlet 60 to nozzle 80. The pellets then pass into the heated inlet bush where they are heated beyond their melting point. The resultant liquid polymer flows into the manifold and then to the outlets of the manifold and into injection nozzles 130 of tool halves 120 of fixed plate 110. The melted polymer then passes into the injection cavity for forming the mold half.

Heating is provided by a coil 135 situated around nozzle 130. Thermocouple 140, arranged on the opposite side of tool portion 150 from injection nozzle 130, is used to monitor the temperature of the injected polymer. Heating of nozzle 130 is controlled to ensure that the molten polymer is injected into each of the eight injection cavities at the same temperature, and hence, at the same flow rate. Non-constant flow rates can result in stresses in the formed mold half, which in turn can result in deformations and inconsistencies in a contact lens formed using the mold half. Non-constant flow rates can also result in different levels of fit different radii (and hence different powers). Careful control of pressure and cooling gives consistency and uniformity; in contrast, poor control can result in a need to stop injection, selectively, into cavities in which the flow rate has deviated too far from a target value.

Once the cavity is full of polymer, the pins for injection nozzles 130 are moved forward to shut off nozzles 130 from the cavities. Such an action stops the flow of polymer. Coolant (in this example water) is constantly circulated through coolant flow passages 165 to cool the polymer and thereby form the mold half. Coolant flow passages 165, 250, 320 in tool halves 120, 220 are situated close to the outermost surface of tool portion 150 and the optical-quality surface of tool insert 260 carried by quick-change plate 210, respectively. Such a configuration of coolant flow passages provides direct cooling of the portion of the mold half used to form the optic zone of a lens as the mold half forms in the cavity. Rapid cooling of nucleated material results in good quality, uniform, mold halves. Without nucleation, slower cooling in the middle of the material can result in bigger crystals in the middle of the material. Once the mold half is formed, reciprocating drive 200 moves mounting plate 190, and with it, quick-change plate 210, away from fixed plate 110, opening the cavity. The newly formed mold half remains in tool portion 150 in fixed plate 110. The stripper plate moves from the rearward, mold-half forming position to the forward, mold half ejecting position, pushing on the peripheral regions of each mold half to eject them from the tool portion in the fixed plate 110. In an alternative embodiment, ejector pins can be used to eject the mold halves.

After ejection by the stripper plate, the mold half is free to fall under gravity, but is sucked onto a gripper plate 400 before it can do so, as described further below.

Figure 11A:
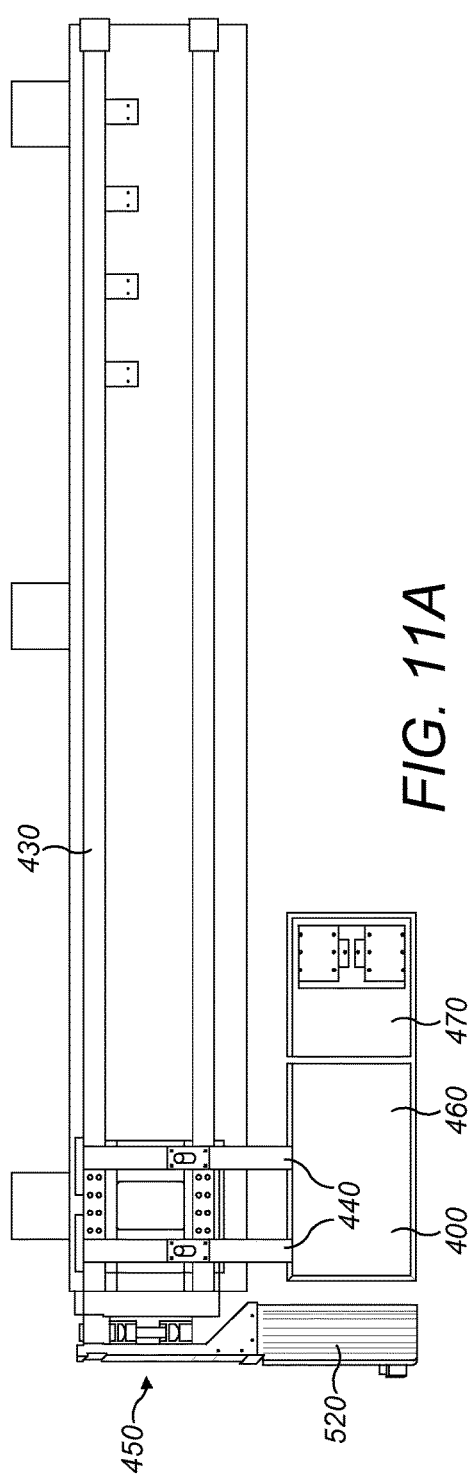
FIG. 11A is a back view of the gripper plate, gripper plate rail, and drive system of the take-out cell shown in FIG. 10.
Figure 11B:
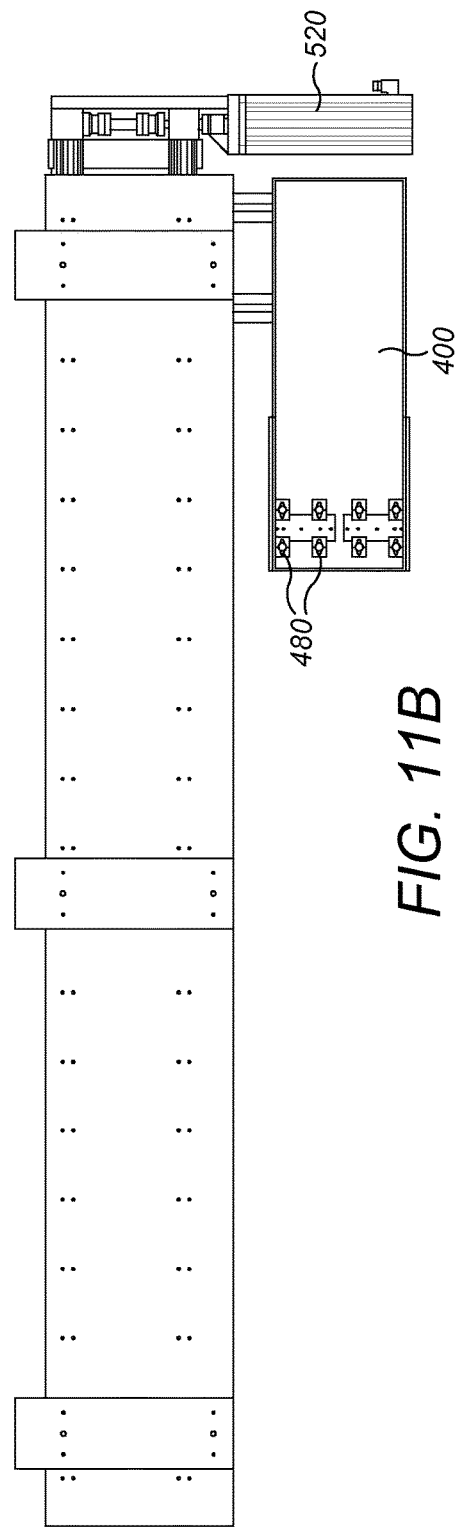
FIG. 11B is a front view of the gripper plate, gripper plate rail, and drive system shown in FIG. 11A.
Figure 12:
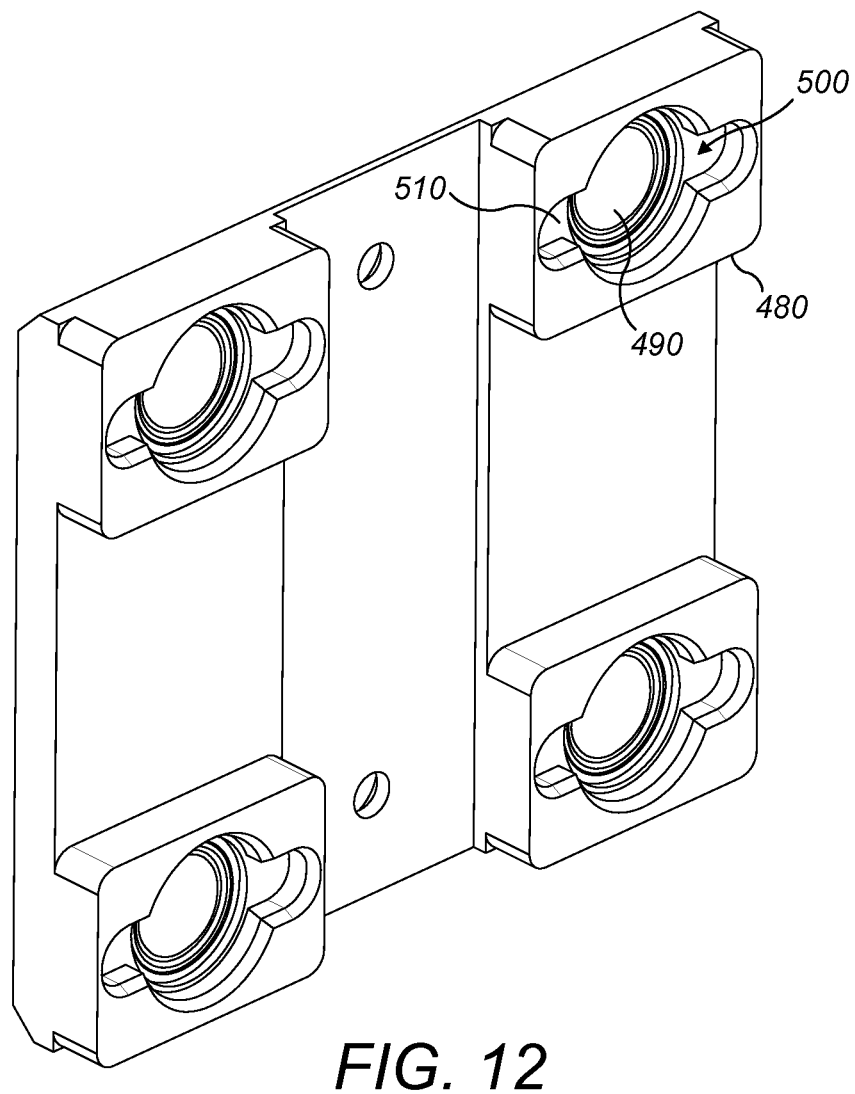
FIG. 12 is an enlarged, perspective, partial front view of the gripper plate shown in FIGS. 11A and 11B, showing a set of four mold-receiving heads.
Figure 13:
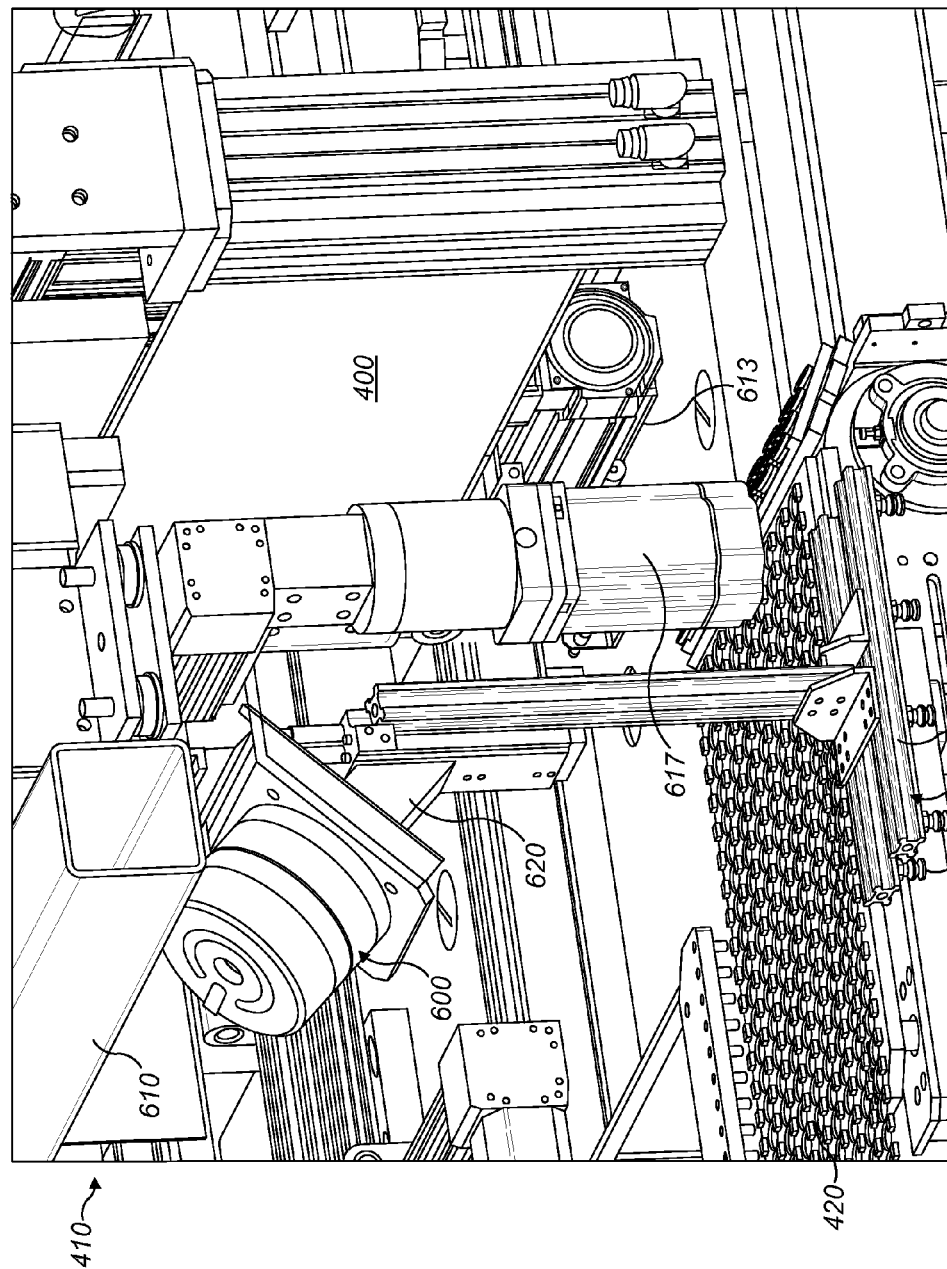
FIG. 13 is a perspective view of a pick head of the take-out cell shown in FIG. 10, the pick head being mostly obscured from view in FIG. 10.
Figure 14:
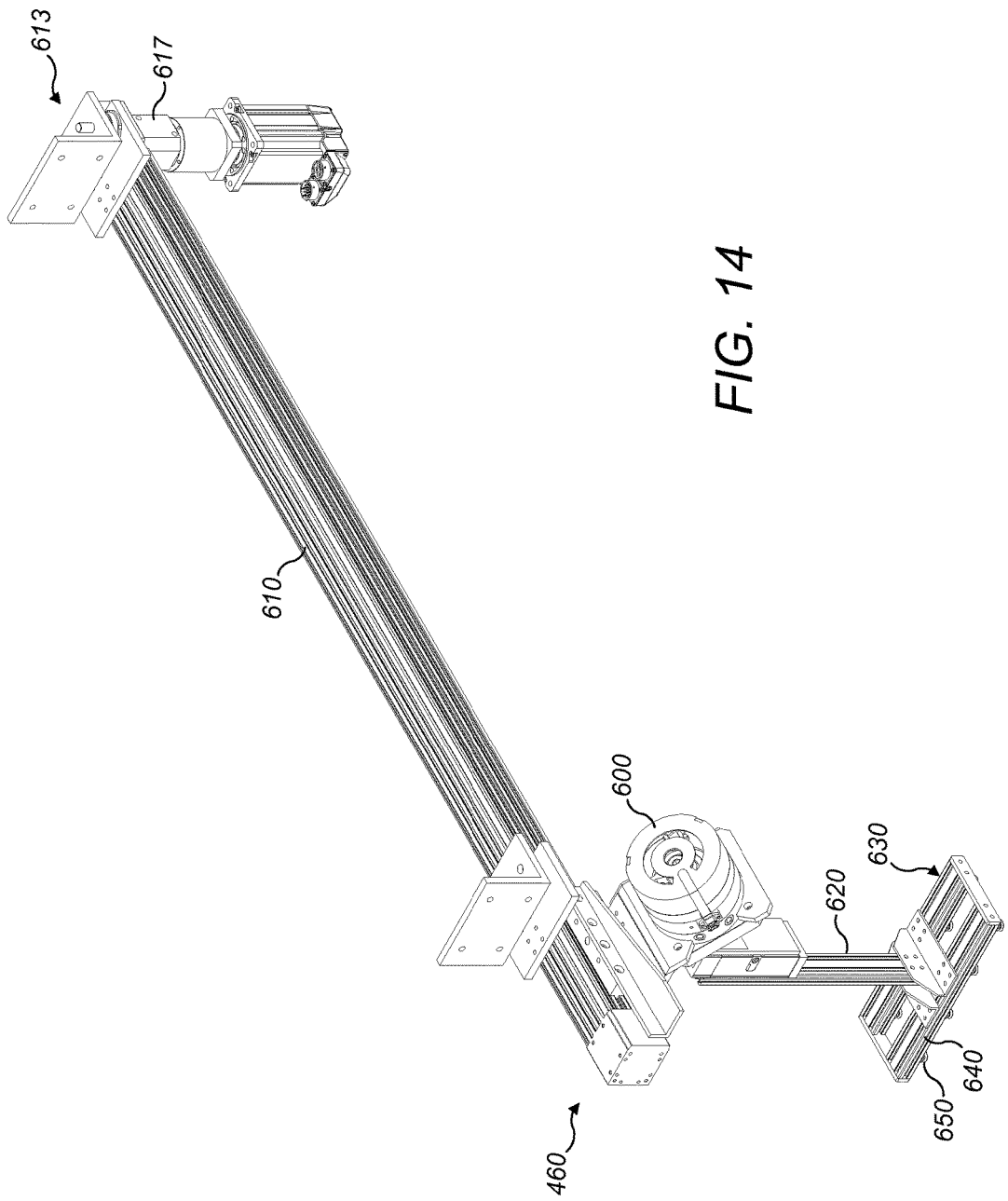
FIG. 14 is a an isolated perspective view of a pick head unit including the pick head shown in FIG. 13.

A take-out cell 30 (FIGS. 10 to 14) includes a reciprocating gripper plate 400, a pick-and-place unit 410, and a conveyor 420. Gripper plate 400 (FIG. 11) is mounted on a gripper-plate rail 430 that is perpendicular to the plane of contact of fixed plate 110 and quick-change plate 210 of injection unit 40. If the plates do not contact each other, the plane of contact can be a plane that is parallel to the facing surfaces of fixed plate 110 and quick-change plate 210. Gripper plate 400 is carried on two depending brackets 440 on a linear electromagnetic drive unit 450. Gripper plate 400 comprises a proximal rectangular portion 460, to which depending brackets 440 connect, and a distal gripper portion 470, having a front surface on the side of gripper plate 400 nearest injection unit 40. Distal gripper portion 470 includes eight mold-receiving heads 480 in its front surface. Each mold-receiving head 480 (FIG. 12) includes a recess 490, shaped and sized to receive a mold half formed in injection-molding cell 20. Each mold-receiving head 480 is of rectangular form and lies within a recessed region 490 such that the front surface of mold-receiving head 480 is flush with the front surface of distal gripper portion 470. Each recess 490 includes a concave dish portion 500 and two slot portions 510 on either side of concave dish portion 500. At the rear of the concave disc portion is an outlet (not shown). The outlet is connected to a vacuum pump (not shown).

Electromagnetic drive unit 450 includes a linear motor 520 that enables high acceleration and deceleration of gripper plate 400, compared with the operation of a servo motor, for example. Gripper plate 400 is made of carbon fiber and is light weight, further increasing the acceleration and deceleration that can be achieved. Gripper plate 400 employs suction to gather the mold halves. In contrast with other systems, the use of this gripper plate arrangement is less complex, slimmer, and faster. By using this gripper plate arrangement, the gripper plate can rapidly enter into, and leave, the mold half forming parts of the apparatus, minimizing the delay between formation of successive sets of mold halves.

Figure 15:
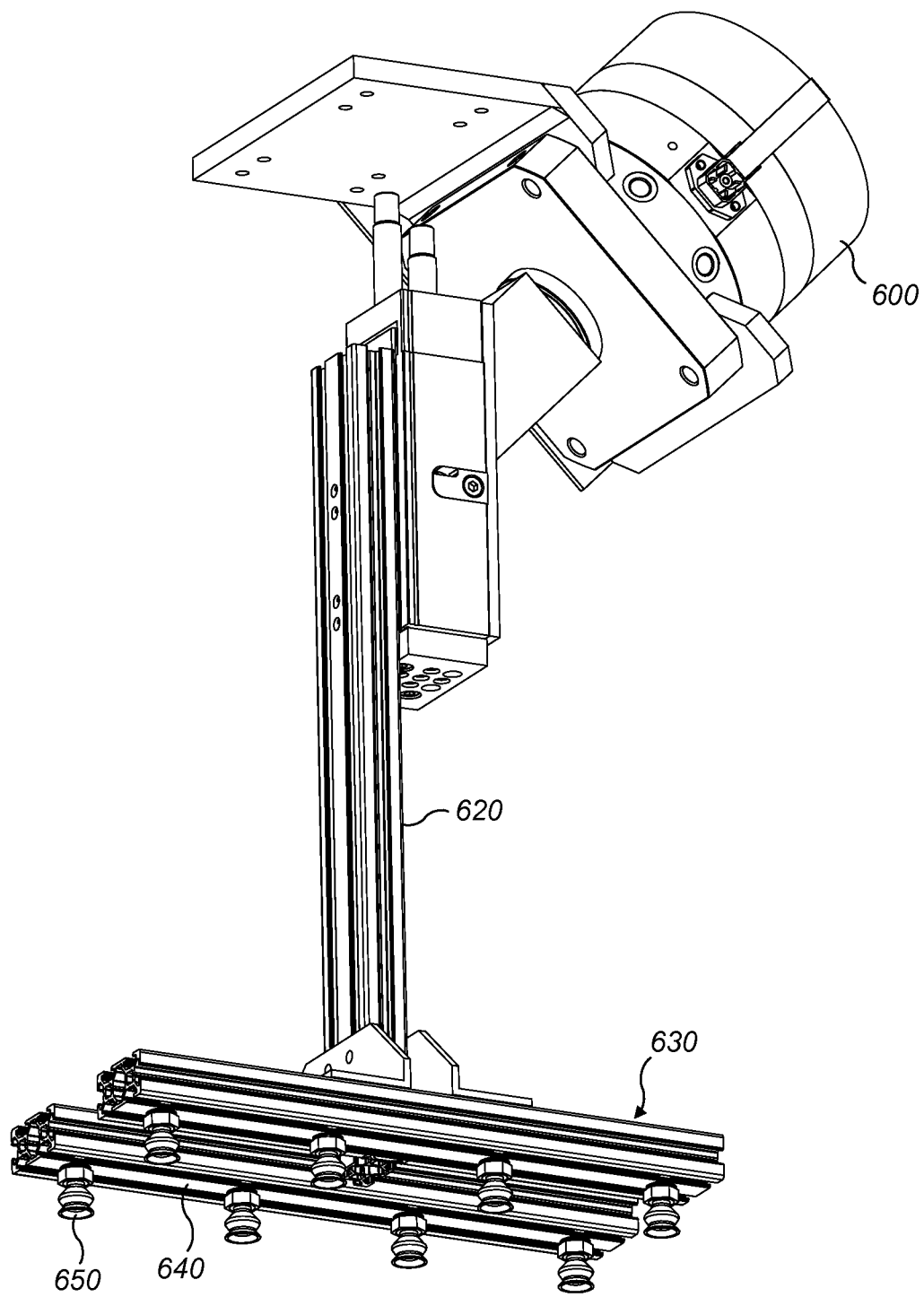
FIG. 15 is an enlarged bottom perspective view of the pick head shown in FIGS. 13 and 14.

A pick-and place unit 410 (FIGS. 13 to 15) includes a pick-and-place rotary drive unit 600 mounted on a rail 610 and configured to carry a rotatable arm 620 that is tubular and of square cross-section. A pick head 630 is mounted on the rotatable arm 620. Pick head 630 is formed of tubular members 640, each of square cross-section and which together form an H shape. Each of tubular members 640 forming the two sides of the 'H' carries four inlets 650 that are connected via piping to a vacuum pump (not shown). Pick-and-place rotary drive unit 600 rotates rotatable arm 620 from a vertical orientation in which tubular members 640 of pick head 630 are horizontal (as shown in the drawings) to a vertical orientation in which tubular members 640 of pick head 630 are vertical (not shown) and hence parallel to the face of gripper plate 400.

Pick-and-place rotary drive unit 600 is itself propelled along rail 610 by a linear drive unit 613 including a linear motor 617. Linear drive unit 613 moves rotary drive unit 600, and hence pick head 630, between a position over conveyor 420 and a position adjacent to gripper plate 400 when gripper plate 400 is furthest from injection-molding cell 20.

Figure 16:
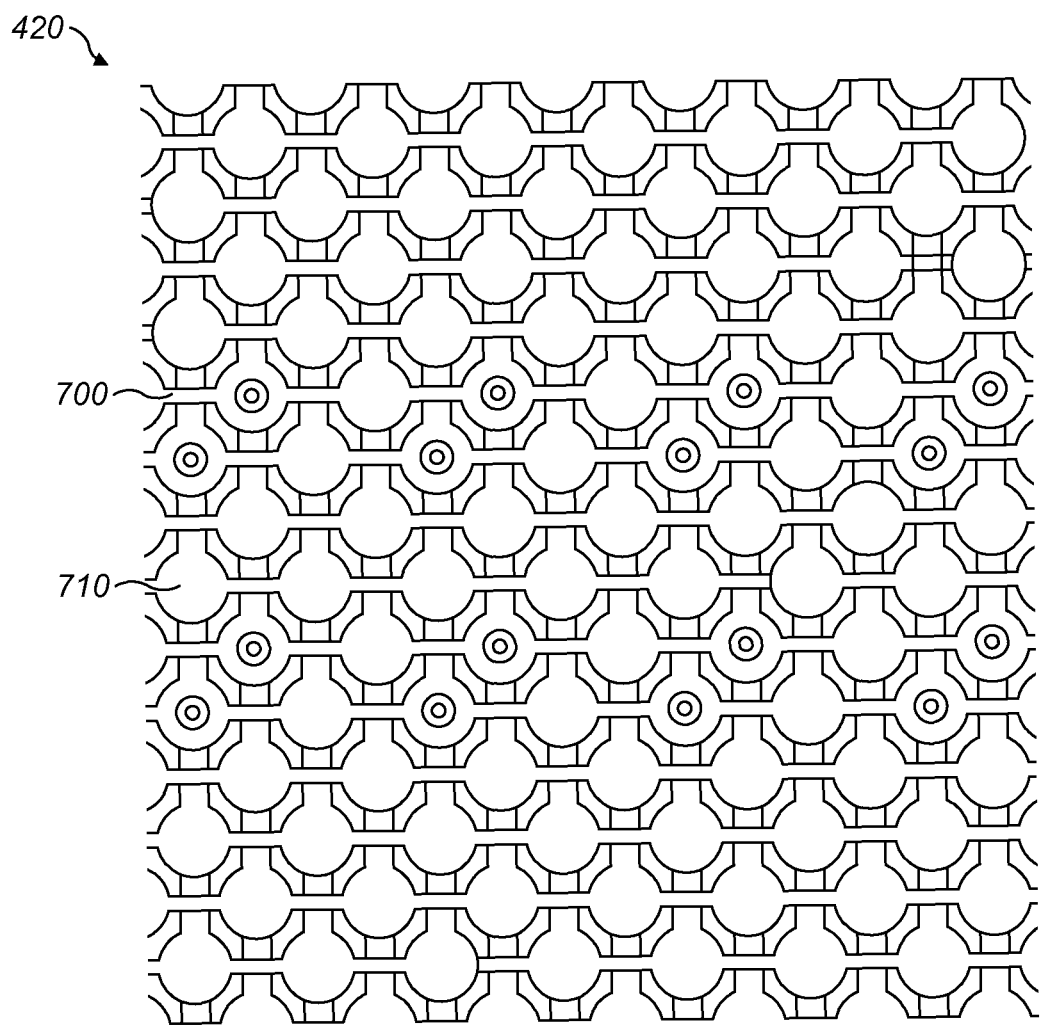
FIG. 16 is a detail of the conveyor of the apparatus shown in FIG. 10.

As shown in FIG. 16, conveyor 420 has a surface 700 having a plurality of cells 710 for receiving mold halves, where each cell is configured to hold a single mold half. Cells 710 form a 2D pattern or array. Cells 710 are arranged in groups of 32, made up of four rows of eight cells. The rows are staggered, so that cells 710 of one row lie in the interstitial areas between cells 710 of the next row, which provides closer packing of cells 710 than if cells 710 in all rows were aligned. The spacing of inlets 650 of pick head 630 is such that when pick head 630 is over conveyor 420, successive pairs of inlets 650 align with successive groups of cells 710. Specifically, the pairs of inlets 650 are separated from each other by three rows of cells 710 (i.e., the pairs of inlets 650 align with every $4^{th}$ row of 16 rows) and inlets 650 in each pair are separated from each other by one cell 710 (i.e., the inlets 650 align with, for example, the first and third cells 710 of each row).

In use as described above, reciprocating drive 200 moves quick-change plate 210 into contact with fixed plate 110 of injection unit 40, forming the injection cavities. Even if quick-change plate 210 and fixed plate 110 do not, themselves, contact one another, they can be brought into such close proximity that tool halves held by each plate can be made to contact each other. Molten polymer is injected and cooled, and eight mold halves are thereby formed. Reciprocating drive 200 moves quick-change plate 210 out of contact with fixed plate 110 of injection unit 40, leaving the mold halves in tool portions 150 of fixed plate 110.

Gripper plate 400 is translated by linear electromagnetic drive unit 450 along gripper-plate rail 430 towards the injection unit. That motion continues until distal gripper portion 470 is inserted between fixed plate 110 and quick-change plate 210. Distal gripper portion 470 is inserted such that it is immediately adjacent to fixed plate 110, and mold-receiving heads 480 of distal gripper portion 470 align with tool portions 150 of fixed plate 110. The mold halves are dislodged by the stripper plate from tool portions 150 of fixed plate 110. The vacuum pump operates to suck air from concave disc portion 500 of each mold-receiving head 480, sucking the mold halves into concave disc portions 500, before they can fall under gravity. As mold halves are taken from fixed plate 110, they are therefore always in exactly the same position on each incursion of gripper plate 400.

Linear electromagnetic drive unit 450 of take-out cell 30 then sends a signal to reciprocating unit 50 that it should move quick-change plate 210 forward, towards fixed plate 110, to start another cycle of mold half formation, and then retracts distal gripper portion 470 from between fixed plate 110 and quick-change plate 210, translating gripper plate 400 back along gripper plate rail 430.

Note that the separation of quick-change plate 210 from fixed plate 110, the incursion of distal gripper portion 470 between those plates, and the subsequent closing of them together again, is synchronized to minimize the dwell time of gripper plate 400, i.e., to minimize the period of "dead" time for which gripper plate 400 is stationary at fixed plate 110. Gripper portion 470 enters between plates 110, 210 as soon as there is room, stops only instantaneously as it reverses direction, and leaves as plates 110, 210 are closing. The overall take-out time, from starting to separate plates 110, 210 to the signal being sent that causes them to close again, is approximately 180 ms in this exemplary embodiment. The high acceleration and deceleration made possible by using a linear motor 570 and lightweight carbon-fiber material contributes to this performance.

Electromagnetic drive unit 450 stops gripper plate 400 at a position at which it is met by pick head 630 of pick-and-place unit 410. Pick head 630 is vertical and its inlets line up with mold-receiving heads 480 of gripper plate 400. The vacuum pump connected to mold-receiving heads 480 turns off, and simultaneously the vacuum pump connected to recesses 490 of pick head 630 is turned on. The mold halves are thus transferred from mold-receiving head 480 to pick head 630. Linear electromagnetic drive 450 of take-out cell 30 translates rotating arm 620 and pick head 630 from the position at which pick head 630 meets gripper plate 400 to the position over conveyor belt 420. Pick-and-place rotary drive unit 600 rotates rotating arm 620 from the horizontal position to the vertical position, and hence, pick head 630 is moved from the vertical position to the horizontal position. The vacuum pump connected to pick head 630 is turned off, and the mold halves are thereby released into cells 710 of surface 700 of conveyor 420.

The position of release of the mold halves onto conveyor surface 700 is translated on each pass by one cell so that cells 710 of conveyor 420 are filled in pairs across the eight rows, in four passes. When a row is full, conveyor 420 advances by one row. When eight rows are full, three of the four pairs of inlets have reached rows filled by other inlets, i.e., there are no remaining gaps in a block of 128 cells 710. Conveyor 420 then advances by 16 rows to present an empty set of 128 cells 710 (i.e., 4 groups of 32 cells 710) to pick head 630 on its next return. Conveyor 420 thus advances the mold halves in cells 710 away from the location at which they are released from pick head 630 and towards a receptacle (not shown) at the end of conveyor 420. As cells 710 of conveyor surface 700 tip over the edge of conveyor 420 at that end, the mold halves in cells 710 are tipped into the receptacle. The mold halves in the receptacle are periodically removed for use in forming contact lenses.

While the present disclosure has been described and illustrated with reference to particular embodiments, it will be appreciated by those of ordinary skill in the art that the disclosure lends itself to many different variations not specifically illustrated herein.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can therefore be absent, in other embodiments.

The invention claimed is:

1. An apparatus for forming a contact lens mold half for use in manufacturing a contact lens, the apparatus comprising:
    an injection-molding unit including a first plate for carrying a plurality of first tool halves, and a second plate for carrying a plurality of second tool halves, at least one of the first plate and the second plate being arranged to reciprocate between (i) an open configuration in which the first plate and the second plate are spaced apart from one another, and (ii) a closed configuration in which the first plate and the second plate are in such close proximity to one another that the first and second tool halves, when carried by the first plate and the second plate, contact one another and together each pair of tool halves define an injection molding cavity for forming a contact lens mold half; and
    a contact lens mold half removal unit including a rail, a gripper plate mounted on the rail, and a linear motor arranged to propel the gripper plate from (i) a receive position between the first plate and the second plate when the first plate and the second plate are in the open configuration, toward (ii) a deliver position; the gripper plate including a plurality of mold-removing elements for receiving mold halves from tool halves in the first plate or second plate when the gripper plate is in the receive position,
    wherein the first plate and the second plate are arranged to begin to close from the open configuration to the closed configuration before the gripper plate has been fully removed from between the first plate and the second plate.

2. The apparatus as claimed in claim 1, wherein the mold-removing elements are mold-receiving heads in positions on the gripper plate corresponding to positions of first or second tool halves carried by the first plate.

3. The apparatus as claimed in claim 2, wherein each of the mold-receiving heads include a vacuum inlet, configured to apply vacuum to a formed contact lens mold half and transfer it from a tool half into the mold-receiving head.

4. The apparatus as claimed in claim 1, further including: a transporter arranged to transport mold halves for further processing; and a take-off robot arranged to receive mold halves from the gripper plate, when the gripper plate is in the deliver position, and to transfer mold halves received from the gripper plate to the transporter.

5. The apparatus of claim 4, wherein the take-off robot includes a pick head having vacuum inlets.

6. The apparatus as claimed in claim 5, wherein the vacuum inlets of the pick head are arranged to be adjacent to the mold-removing elements of the gripper plate when the gripper plate is in the deliver position, to receive mold halves from the gripper plate.

7. The apparatus as claimed in claim 5, wherein the take-off robot comprises an arm that carries the pick head and is configured to move from a first orientation when the take-off robot receives the mold halves from the gripper plate, to a second, different, orientation when the take-off robot provides the mold halves to the transporter.

8. The apparatus as claimed in claim 4, wherein the transporter comprises a surface having a plurality of cells to receive mold halves.

9. The apparatus of claim 1, further comprising a plurality of first tool halves and a plurality of second tool halves, the plurality of first tool halves being disposed in, on, or in and on, the first plate, and the plurality of second tool halves being disposed in, on, or in and on, the second plate.

10. The apparatus of claim 1, wherein the first plate and the second plate contact each other in the closed configuration.

11. A method for manufacturing contact lens mold halves, the method comprising:
    reciprocating a first plate carrying a plurality of first tool halves, a second plate carrying a plurality of second tool halves, or both, relative to each other, between (i) an open configuration in which the first plate and the second plate are spaced apart, and (ii) a closed configuration in which the first plate and the second plate are in such close proximity to one another that the first and second tool halves contact one another and together define a plurality of injection molding cavities, each of the plurality of injection molding cavities forming a separate contact lens mold half;
    bringing the first plate and the second plate into the closed configuration and injecting a mold-forming material into the plurality of injection molding cavities, thereby forming a plurality of injection molded contact lens mold halves;
    during the reciprocating, propelling a gripper plate with a linear motor between a receive position and a deliver position wherein the gripper plate is mounted on a rail, the receive position being a location where the gripper plate is positioned between the first plate and the second plate when the first plate and the second plate are in the open configuration, and the deliver position being a location where the gripper plate is not positioned between the first plate and the second plate; and
    receiving, with mold-removing elements of the gripper plate, the plurality of contact lens mold halves from the first or second tool halves when the gripper plate is in the receive position, and
    wherein the first plate and the second plate begin to close from the open configuration to the closed configuration before the gripper plate has been fully removed from between the first plate and the second plate.

12. The method as claimed in claim 11, further comprising applying a vacuum to each of the mold-removing elements to thereby transfer the plurality of contact lens mold halves from the first or second tool halves into the mold-removing elements of the gripper plate.

13. The method as claimed in claim 11, wherein the receiving comprises stopping the gripper plate instantaneously at the receive position.

14. The method as claimed in claim 11, wherein, during the reciprocating, the first plate and the second plate are moved from the open configuration to the closed configuration before the gripper plate has reached the deliver position.

15. The method as claimed in claim 11, further comprising synchronizing the steps of opening the first plate and the second plate during the reciprocating, followed by inserting the gripper plate between the first plate and the second plate during the propelling, followed by removing the gripper plate from between the first plate and the second plate following the receiving, and followed by closing the first plate and the second plate during the reciprocating, the synchronizing thereby minimizing dwell time of the gripper plate between the first plate and the second plate during the reciprocating.

16. The method as claimed in claim 11, further comprising accelerating the gripper plate away from the receive position at a rate of more than 45 m/s² following the receiving.

17. The method as claimed in claim 11, further comprising stopping the gripper plate at the deliver position; approaching the gripper plate with a pick head at the deliver position, and transferring the plurality of contact lens mold halves from the gripper plate to the pick head during a delivering.

18. The method as claimed in claim 17, further comprising applying a vacuum to the mold-removing elements, then, during the delivering, stopping the application of vacuum to the mold-removing elements, and, substantially simultaneously, starting applying vacuum through vacuum inlets in the pick head, thereby causing the transferring of the contact lens mold halves from the mold-removing elements of the gripper plate to the pick head.

19. The method as claimed in claim 17, further comprising, following the transferring, moving the pick head from the deliver position to a transport position in which the plurality of contact lens mold halves are provided to a transporter.

20. The method as claimed in claim 19, wherein moving from the deliver position to the transport position comprises moving the pick head from a vertical position to a horizontal position.

21. The method as claimed in claim 19, wherein, when the pick head is in the transport position, the application of vacuum to the pick head is stopped, thereby releasing the plurality of contact lens mold halves onto the transporter.

22. A method for manufacturing contact lens mold halves and a contact lens, the method comprising:
reciprocating a first plate carrying a plurality of first tool halves, a second plate carrying a plurality of second tool halves, or both, relative to each other, between (i) an open configuration in which the first plate and the second plate are spaced apart, and (ii) a closed configuration in which the first plate and the second plate are in such close proximity to one another that the first and second tool halves contact one another and together define a plurality of injection molding cavities, each of the plurality of injection molding cavities forming a separate contact lens mold half;
bringing the first plate and the second plate into the closed configuration and injecting a mold-forming material into the plurality of injection molding cavities, thereby forming a plurality of injection molded contact lens mold halves;
during the reciprocating, propelling a gripper plate with a linear motor between a receive position and a deliver position wherein the gripper plate is mounted on a rail, the receive position being a location where the gripper plate is positioned between the first plate and the second plate when the first plate and the second plate are in the open configuration, and the deliver position being a location where the gripper plate is not positioned between the first plate and the second plate;
receiving, with mold-removing elements of the gripper plate, the plurality of contact lens mold halves from the first or second tool halves when the gripper plate is in the receive position, wherein the first plate and the second plate begin to close from the open configuration to the closed configuration before the gripper plate has been fully removed from between the first plate and the second plate; and
placing a polymerizable composition onto a lens forming surface of individual first contact lens mold halves; contacting the first contact lens mold halves with the second contact lens mold halves to form contact lens mold assemblies having the polymerizable composition in contact lens-shaped cavities; exposing the mold assemblies to conditions to polymerize the polymerizable composition present in the contact lens-shaped cavities to form polymerized contact lens bodies; demolding and delensing the mold assemblies to release the polymerized contact lens bodies; optionally washing, or extracting, or hydrating, or any combination thereof, the released contact lens bodies; sealing the contact lens bodies in contact lens packages with packaging solution; and sterilizing the sealed packages to form packaged contact lenses.

23. The apparatus as claimed in claim 1, wherein the gripper plate comprises carbon fiber material.

24. The method as claimed in claim 11, wherein the gripper plate comprises carbon fiber material.

* * * * *